(12) United States Patent
Chen et al.

(10) Patent No.: US 12,266,115 B2
(45) Date of Patent: Apr. 1, 2025

(54) SYSTEMS AND METHODS FOR MOVEMENT CONTROL

(71) Applicant: ZHEJIANG DAHUA TECHNOLOGY CO., LTD., Zhejiang (CN)

(72) Inventors: Mingzhu Chen, Hangzhou (CN); Zengqi Yang, Hangzhou (CN); Zhiyong Xu, Hangzhou (CN); Huimin Wu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 479 days.

(21) Appl. No.: 17/659,838

(22) Filed: Apr. 19, 2022

(65) Prior Publication Data

US 2022/0245827 A1    Aug. 4, 2022

Related U.S. Application Data

(63) Continuation of application No. PCT/CN2020/126854, filed on Nov. 5, 2020.

(30) Foreign Application Priority Data

Dec. 5, 2019  (CN) .......................... 201911234042.0

(51) Int. Cl.
*G06K 9/00* (2022.01)
*G06T 7/20* (2017.01)
(Continued)

(52) U.S. Cl.
CPC .................. *G06T 7/20* (2013.01); *G06T 7/70* (2017.01); *G06V 10/255* (2022.01);
(Continued)

(58) Field of Classification Search
CPC ............ G06T 7/20; G06T 7/70; H04N 23/695
See application file for complete search history.

(56) References Cited

U.S. PATENT DOCUMENTS

| 2017/0134631 A1* | 5/2017 | Zhao ..................... G01S 3/7864 |
| 2017/0261604 A1 | 9/2017 | Van Voorst |

(Continued)

FOREIGN PATENT DOCUMENTS

| CN | 1971457 A | 5/2007 |
| CN | 102074113 A | 5/2011 |

(Continued)

OTHER PUBLICATIONS

International Search Report in PCT/CN2020/126854 mailed on Feb. 3, 2021, 5 pages.

(Continued)

*Primary Examiner* — Molly Wilburn
*Assistant Examiner* — Aidan Keup
(74) *Attorney, Agent, or Firm* — METIS IP LLC

(57) ABSTRACT

The present disclosure may provide a method for movement control. The method may include obtaining at least one tracking parameter associated with a moving object and a control algorithm including a first control algorithm and a second control algorithm associated with a capture device used to track the moving object. The method may also include determining a switching time point with respect to the first control algorithm and the second control algorithm. Further, the method may include accelerating, according to the first control algorithm, a speed of the capture device within a first acceleration time period from a start time point to the switching time point and accelerating, according to the second control algorithm from the switching time point to an acceleration termination time point.

19 Claims, 14 Drawing Sheets

(51) Int. Cl.
*G06T 7/70* (2017.01)
*G06V 10/20* (2022.01)
(52) U.S. Cl.
CPC ............... *G06T 2207/30232* (2013.01); *G06T 2207/30244* (2013.01); *G06V 2201/07* (2022.01)

(56) References Cited

U.S. PATENT DOCUMENTS

| | | | |
|---|---|---|---|
| 2018/0284762 | A1 | 10/2018 | Green et al. |
| 2019/0204828 | A1 | 7/2019 | Ishikawa et al. |
| 2019/0324469 | A1 | 10/2019 | Chen |

FOREIGN PATENT DOCUMENTS

| | | | |
|---|---|---|---|
| CN | 102355574 A | | 2/2012 |
| CN | 102664585 A | | 9/2012 |
| CN | 103439977 A | | 12/2013 |
| CN | 103533246 A | | 1/2014 |
| CN | 103616817 A | | 3/2014 |
| CN | 104796060 A | | 7/2015 |
| CN | 105652891 A | | 6/2016 |
| CN | 106393106 A | | 2/2017 |
| CN | 107270899 A | | 10/2017 |
| CN | 107658527 A | | 2/2018 |
| CN | 107671859 A | | 2/2018 |
| CN | 107817764 A | | 3/2018 |
| CN | 107844058 A | | 3/2018 |
| CN | 108021102 A | | 5/2018 |
| CN | 108037663 A | | 5/2018 |
| CN | 108646674 A | | 10/2018 |
| CN | 108667363 A | * | 10/2018 |
| CN | 108748138 A | | 11/2018 |
| CN | 109407621 A | | 3/2019 |
| CN | 109597431 A | | 4/2019 |
| CN | 109889727 A | | 6/2019 |
| CN | 109981008 A | | 7/2019 |
| CN | 110109491 A | | 8/2019 |
| CN | 110222612 A | | 9/2019 |
| CN | 110248082 A | | 9/2019 |
| EP | 2423774 A1 | | 2/2012 |
| EP | 2610606 A2 | | 7/2013 |
| JP | H08249073 A | | 9/1996 |
| KR | 20060005444 A | | 1/2006 |
| WO | 2013158849 A2 | | 10/2013 |
| WO | 2021109789 A1 | | 6/2021 |

OTHER PUBLICATIONS

Written Opinion in PCT/CN2020/126854 mailed on Feb. 3, 2021, 5 pages.
First Office Action in Chinese Application No. 201911234042.0 mailed on Mar. 8, 2021, 15 pages.
Pan, Haihong et al., A High-precision Acceleration and Deceleration Control of 7-segment Dissymmetrical S-shape Curve for Look-ahead, Mechanical Science and Technology for Aerospace Engineering, 34(7): 1024-1030, 2015.
Wu, Jianhua, Fast High Precision Position Control of Servo System Driven by Linear Motor with High Acceleration, Chinese Doctoral Dissertation Full-text Database Information Science and Technology, 2007, 143 pages.
Xu, Bin et al., Power Matching of Flying Cars During Takeoff Stage Based on Dual-mode Driving, Journal of Beijing University of Aeronautics and Astronautics, 44(4): 662-669, 2018.
Hiroyuki Matsuura et al., Accelerating Switching Speed of Thermo-optic MZI Silicon-Photonic Switches with "Turbo Pulse" in PWM Control, 2017 Optical Fiber Communications Conference and Exhibition (OFC), 2017, 3 pages.
Xiong, Jin et al., Judgment and Calculation the Deceleration Point During the Exponential Curve Acceleration and Deceleration Control, Industry Control and Application, 32(1): 7-9, 24, 2013.
Jian, Yi et al., Research and Implementation of S Curve Acceleration and Deceleration Control for Step Motor Based on AT91SAM9261, Light Industry Machinery, 62-66, 2012.
The Extended European Search Report in European Application No. 20896341.3 mailed on Oct. 17, 2022, 10 pages.

* cited by examiner

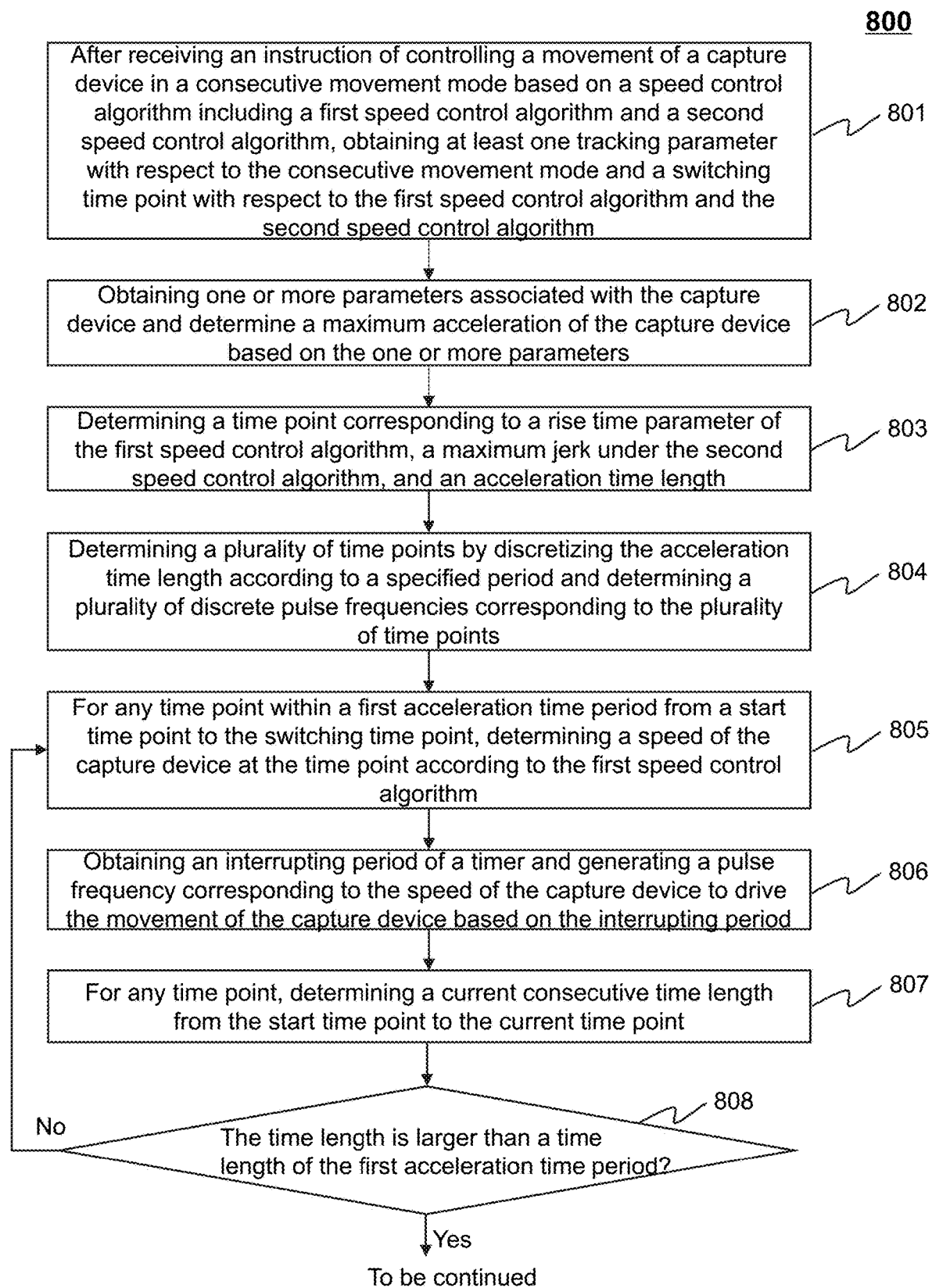
FIG. 8-(1)

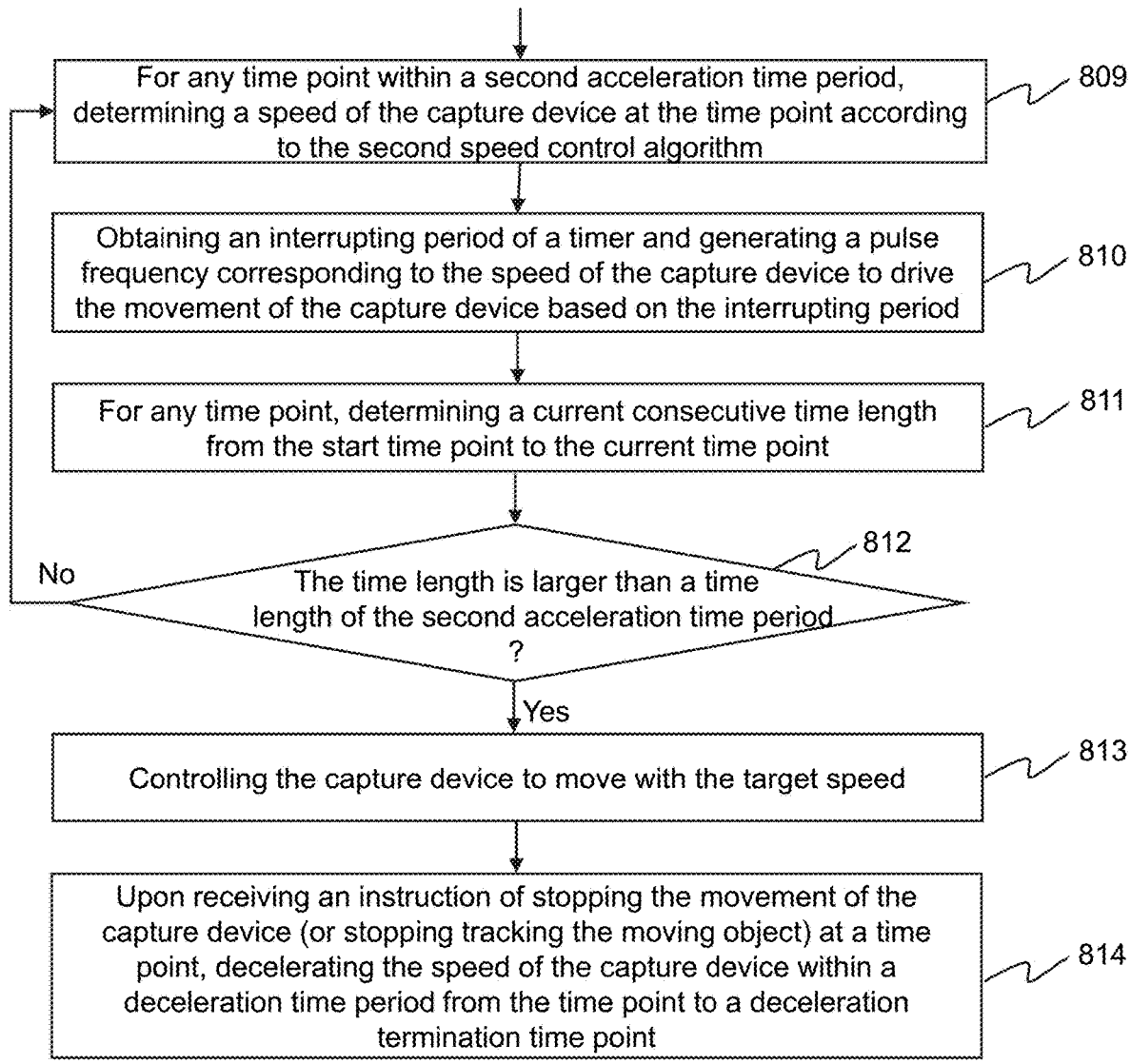
FIG. 8-(2)

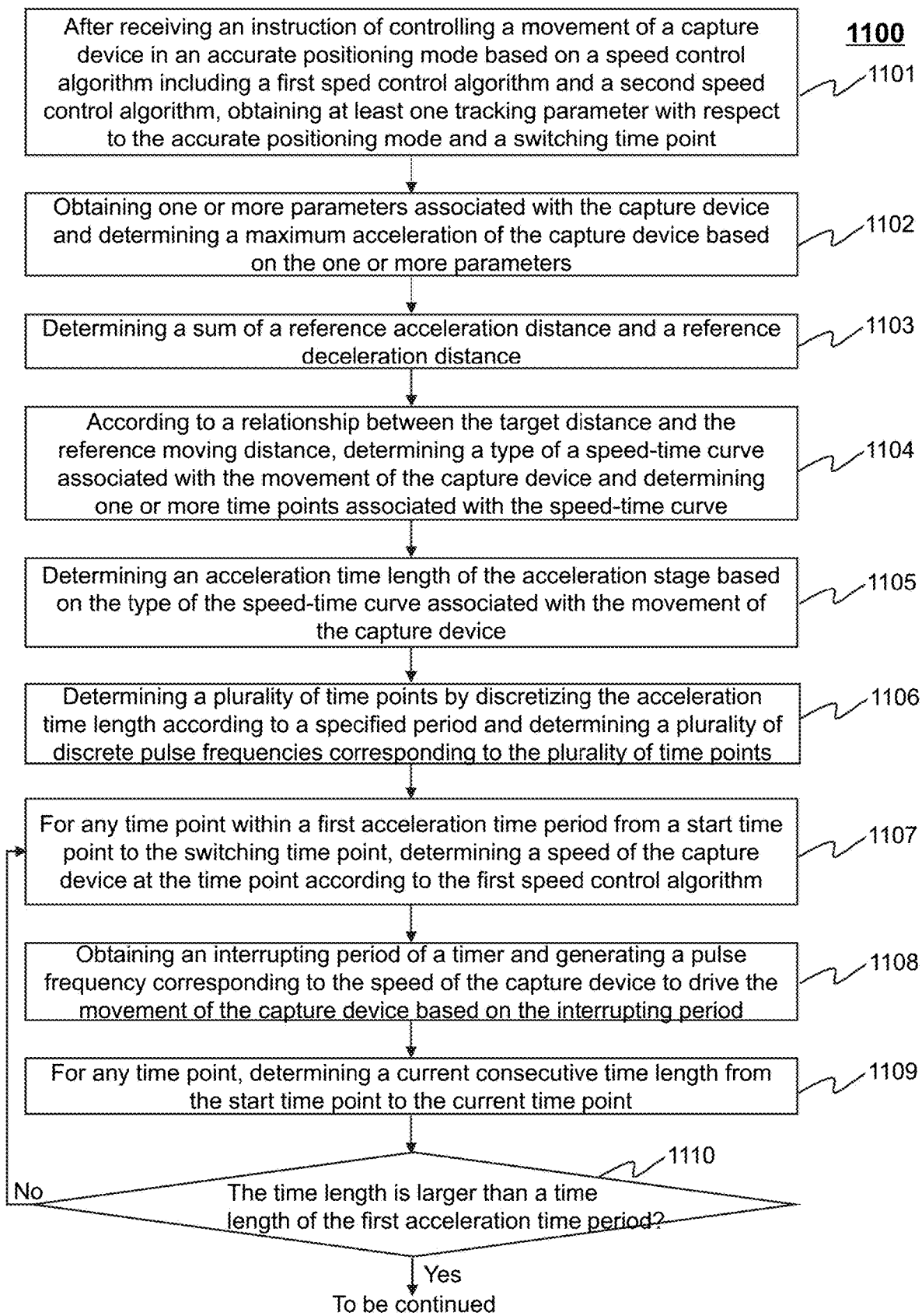
FIG. 11-(1)

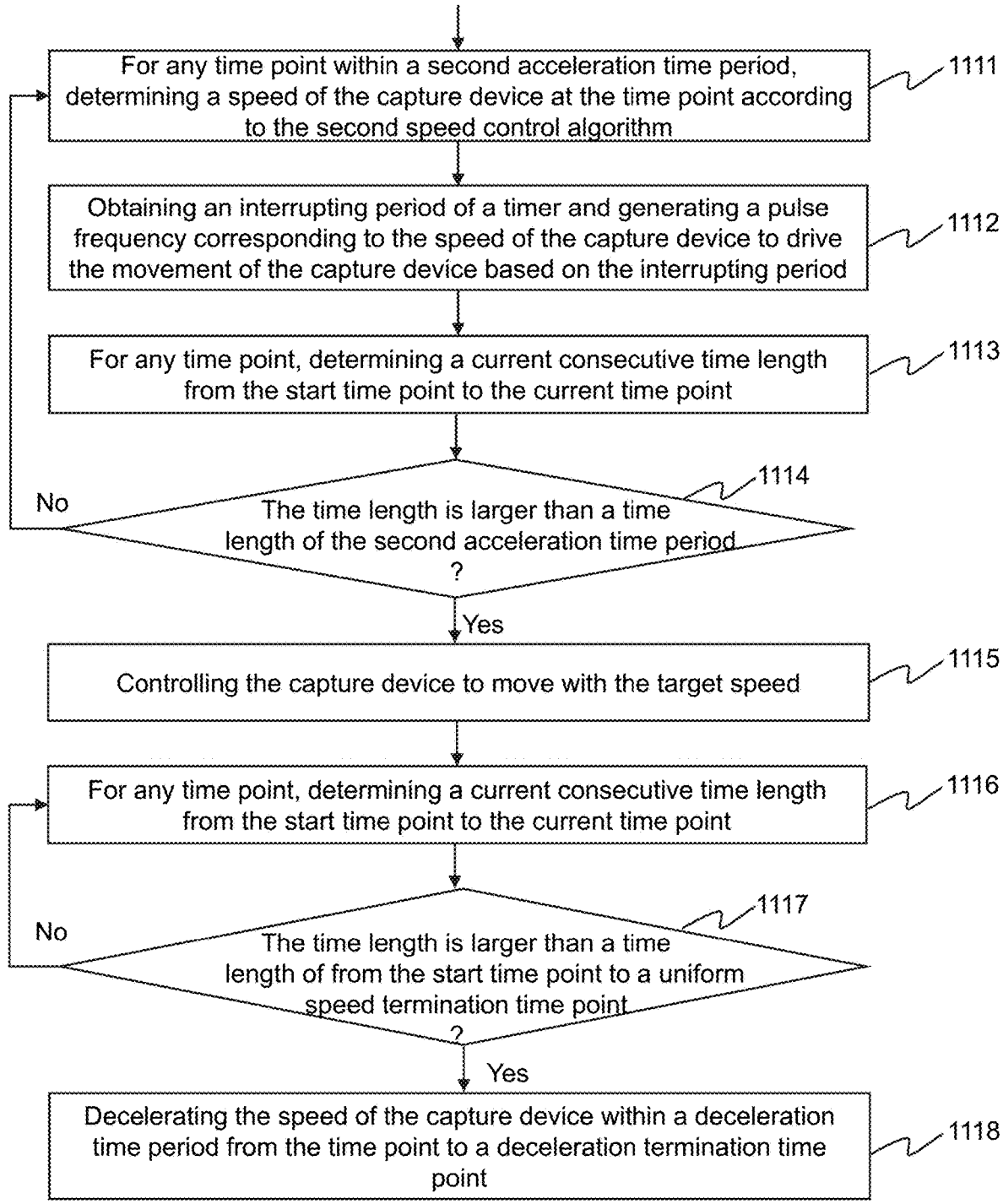
FIG. 11-(2)

SYSTEMS AND METHODS FOR MOVEMENT CONTROL

CROSS-REFERENCE TO RELATED APPLICATIONS

This application is a continuation of International Patent Application No. PCT/CN2020/126854, filed on Nov. 5, 2020, which claims priority to Chinese Patent Application No. 201911234042.0 filed on Dec. 5, 2019, the entire contents of which are hereby incorporated by reference.

TECHNICAL FIELD

The present disclosure generally relates to movement control, and in particular, to systems and methods for controlling movement of a capture device used to track objects based on a control algorithm.

BACKGROUND

With the development of video monitoring technologies, object tracking is becoming more and more important. Commonly, the object tracking is realized via a moving capture device which is controlled based on a control algorithm. That is, the accuracy and efficiency of the control algorithm directly influence the object tracking effect. Therefore, it is desirable to provide systems and methods for accurately controlling a movement of a capture device based on a proper control algorithm, thereby improving the accuracy and efficiency of object tracking.

SUMMARY

According to one aspect of the present disclosure, a system may be provided. The system may include at least one storage device including a set of instructions and at least one processor in communication with the at least one storage device. When executing the set of instructions, the at least one processor may be configured to cause the system to: obtain at least one tracking parameter associated with a moving object; obtain a control algorithm including a first control algorithm and a second control algorithm associated with a capture device used to track the moving object; determine a switching time point with respect to the first control algorithm and the second control algorithm based on the at least one tracking parameter; accelerate, according to the first control algorithm, a speed of the capture device from an initial speed to a first speed within a first acceleration time period from a start time point to the switching time point, the capture device moving a first acceleration distance within the first acceleration time period; and accelerate, according to the second control algorithm, the speed of the capture device from the first speed to a second speed within a second acceleration time period from the switching time point to an acceleration termination time point, the capture device moving a second acceleration distance within the second acceleration time period, wherein at least one of a moving distance of the capture device or the second speed satisfies the at least one tracking parameter, the moving distance of the capture device being determined based at least in part on the first acceleration distance and the second acceleration distance.

In some embodiments, the at least one tracking parameter may include at least one of a target speed or a target distance between an initial location of the capture device and a target location.

In some embodiments, the first control algorithm may include an exponential algorithm or T-shaped algorithm and the second control algorithm includes an S-shaped algorithm.

In some embodiments, wherein to determine the switching time point with respect to the first control algorithm and the second control algorithm based on the at least one tracking parameter, the at least one processor may be configured to cause the system to: determine whether an external load applied to the capture device is larger than an external load threshold; and in response to determining that the external load is larger than the external load threshold, designate a time point corresponding to a turning point of a torque-speed curve associated with the capture device as the switching time point.

In some embodiments, wherein to determine the switching time point with respect to the first control algorithm and the second control algorithm based on the at least one tracking parameter, the at least one processor may be configured to cause the system further to: in response to determining that the external load is smaller than or equal to the external load threshold, determine whether a target speed included in the at least one tracking parameter is smaller than or equal to a speed threshold; and in response to determining that the target speed is smaller than or equal to the speed threshold, designate a time point corresponding to a rise time parameter of the first control algorithm as the switching time point.

In some embodiments, wherein to determine the switching time point with respect to the first control algorithm and the second control algorithm based on the at least one tracking parameter, the at least one processor may be configured to cause the system further to: in response to determining that the target speed is larger than the speed threshold, determine whether a computing load associated with the capture device is larger than a computing load threshold; and in response to determining that the computing load is larger than the computing load threshold, designate the time point corresponding to the rise time parameter of the first control algorithm as the switching time point.

In some embodiments, wherein to determine the switching time point with respect to the first control algorithm and the second control algorithm based on the at least one tracking parameter, the at least one processor may be configured to cause the system further to: in response to determining that the computing load is smaller than or equal to the computing load threshold, designate the time point corresponding to the turning point of the torque-speed curve associated with the capture device as the switching time point.

In some embodiments, the at least one tracking parameter may include the target speed. The second speed may be determined to be equal to the target speed.

In some embodiments, the at least one tracking parameter may include the target speed and the target distance. The moving distance of the capture device may be determined to be equal to the target distance. The second speed may be determined according to a process including: determining, based on the target speed and the control algorithm, a reference acceleration distance, wherein the reference acceleration distance comprises a first reference acceleration distance and a second reference acceleration distance; determining a reference deceleration distance based on the reference acceleration distance; determining a reference moving distance based on the reference acceleration distance and the reference deceleration distance; determining whether the reference moving distance is smaller than or equal to the target distance; and in response to determining the reference moving distance is smaller than or equal to the target distance, designating the target speed as the second speed.

In some embodiments, the process may further include: in response to determining that the reference moving distance is larger than the target distance, determining the second speed based on the target distance and the control algorithm.

In some embodiments, the at least one processor may be configured to cause the system further to: decelerate, according to the second control algorithm, the speed of the capture device from the second speed to the first speed within a first deceleration time period, the capture device moving a first deceleration distance within the first deceleration time period; and decelerate, according to the first control algorithm, the speed of the capture device from the first speed to the initial speed within a second deceleration time period, the capture device moving a second deceleration distance within the second deceleration period, wherein the moving distance of the capture device is determined based at least in part on the first acceleration distance, the second acceleration distance, the first deceleration distance, and the second deceleration distance.

According to another aspect of the present disclosure, a method may be provided. The method may be implemented on a computing device including at least one processor, at least one storage medium, and a communication platform connected to a network. The method may include: obtaining at least one tracking parameter associated with a moving object; obtaining a control algorithm including a first control algorithm and a second control algorithm associated with a capture device used to track the moving object; determining a switching time point with respect to the first control algorithm and the second control algorithm based on the at least one tracking parameter; accelerating, according to the first control algorithm, a speed of the capture device from an initial speed to a first speed within a first acceleration time period from a start time point to the switching time point, the capture device moving a first acceleration distance within the first acceleration time period; and accelerating, according to the second control algorithm, the speed of the capture device from the first speed to a second speed within a second acceleration time period from the switching time point to an acceleration termination time point, the capture device moving a second acceleration distance within the second acceleration time period, wherein at least one of a moving distance of the capture device or the second speed satisfies the at least one tracking parameter, the moving distance of the capture device being determined based at least in part on the first acceleration distance and the second acceleration distance.

In some embodiments, the at least one tracking parameter may include at least one of a target speed or a target distance between an initial location of the capture device and a target location.

In some embodiments, the first control algorithm may include an exponential algorithm or T-shaped algorithm and the second control algorithm may include an S-shaped algorithm.

In some embodiments, the determining the switching time point with respect to the first control algorithm and the second control algorithm based on the at least one tracking parameter may include: determine whether an external load applied to the capture device is larger than an external load threshold; and in response to determining that the external load is larger than the external load threshold, designating a time point corresponding to a turning point of a torque-speed curve associated with the capture device as the switching time point.

In some embodiments, the determining the switching time point with respect to the first control algorithm and the second control algorithm based on the at least one tracking parameter may include: in response to determining that the external load is smaller than or equal to the external load threshold, determining whether a target speed included in the at least one tracking parameter is smaller than or equal to a speed threshold; and in response to determining that the target speed is smaller than or equal to the speed threshold, designating a time point corresponding to a rise time parameter of the first control algorithm as the switching time point.

In some embodiments, the determining the switching time point with respect to the first control algorithm and the second control algorithm based on the at least one tracking parameter may include: in response to determining that the target speed is larger than the speed threshold, determining whether a computing load associated with the capture device is larger than a computing load threshold; and in response to determining that the computing load is larger than the computing load threshold, designating the time point corresponding to the rise time parameter of the first control algorithm as the switching time point.

In some embodiments, the determining the switching time point with respect to the first control algorithm and the second control algorithm based on the at least one tracking parameter may include: in response to determining that the computing load is smaller than or equal to the computing load threshold, designating the time point corresponding to the turning point of the torque-speed curve associated with the capture device as the switching time point.

In some embodiments, the at least one tracking parameter may include the target speed. The second speed may be determined to be equal to the target speed.

In some embodiments, the at least one tracking parameter may include the target speed and the target distance. The moving distance of the capture device may be determined to be equal to the target distance. The second speed may be determined according to a process including: determining, based on the target speed and the control algorithm, a reference acceleration distance, wherein the reference acceleration distance comprises a first reference acceleration distance and a second reference acceleration distance; determining a reference deceleration distance based on the reference acceleration distance; determining a reference moving distance based on the reference acceleration distance and the reference deceleration distance; determining whether the reference moving distance is smaller than or equal to the target distance; and in response to determining the reference moving distance is smaller than or equal to the target distance, designating the target speed as the second speed.

In some embodiments, the process may further include: in response to determining that the reference moving distance is larger than the target distance, determining the second speed based on the target distance and the control algorithm.

In some embodiments, the method may further include: decelerating, according to the second control algorithm, the speed of the capture device from the second speed to the first speed within a first deceleration time period, the capture device moving a first deceleration distance within the first deceleration time period; and decelerating, according to the first control algorithm, the speed of the capture device from the first speed to the initial speed within a second deceleration time period, the capture device moving a second deceleration distance within the second deceleration period, wherein the moving distance of the capture device is determined based at least in part on the first acceleration distance, the second acceleration distance, the first deceleration distance, and the second deceleration distance.

According to another aspect of the present disclosure, a non-transitory computer readable medium may be provided. The non-transitory computer readable medium may include executable instructions that, when executed by at least one processor, direct the at least one processor to perform a method. The method may include: obtaining at least one tracking parameter associated with a moving object; obtaining a control algorithm including a first control algorithm and a second control algorithm associated with a capture device used to track the moving object; determining a switching time point with respect to the first control algorithm and the second control algorithm based on the at least one tracking parameter; accelerating, according to the first control algorithm, a speed of the capture device from an initial speed to a first speed within a first acceleration time period from a start time point to the switching time point, the capture device moving a first acceleration distance within the first acceleration time period; and accelerating, according to the second control algorithm, the speed of the capture device from the first speed to a second speed within a second acceleration time period from the switching time point to an acceleration termination time point, the capture device moving a second acceleration distance within the second acceleration time period, wherein at least one of a moving distance of the capture device or the second speed satisfies the at least one tracking parameter, the moving distance of the capture device being determined based at least in part on the first acceleration distance and the second acceleration distance.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein:

FIG. 8-(1) and FIG. 8-(2) are a flowchart illustrating an exemplary process for controlling a movement of a capture device based on a control algorithm including a first control algorithm and a second control algorithm according to some embodiments of the present disclosure;

FIG. 11-(1) and FIG. 11-(2) are a flowchart illustrating an exemplary process for controlling a movement of a capture device based on a control algorithm including a first control algorithm and a second control algorithm according to some embodiments of the present disclosure.

DETAILED DESCRIPTION

Figure 1:
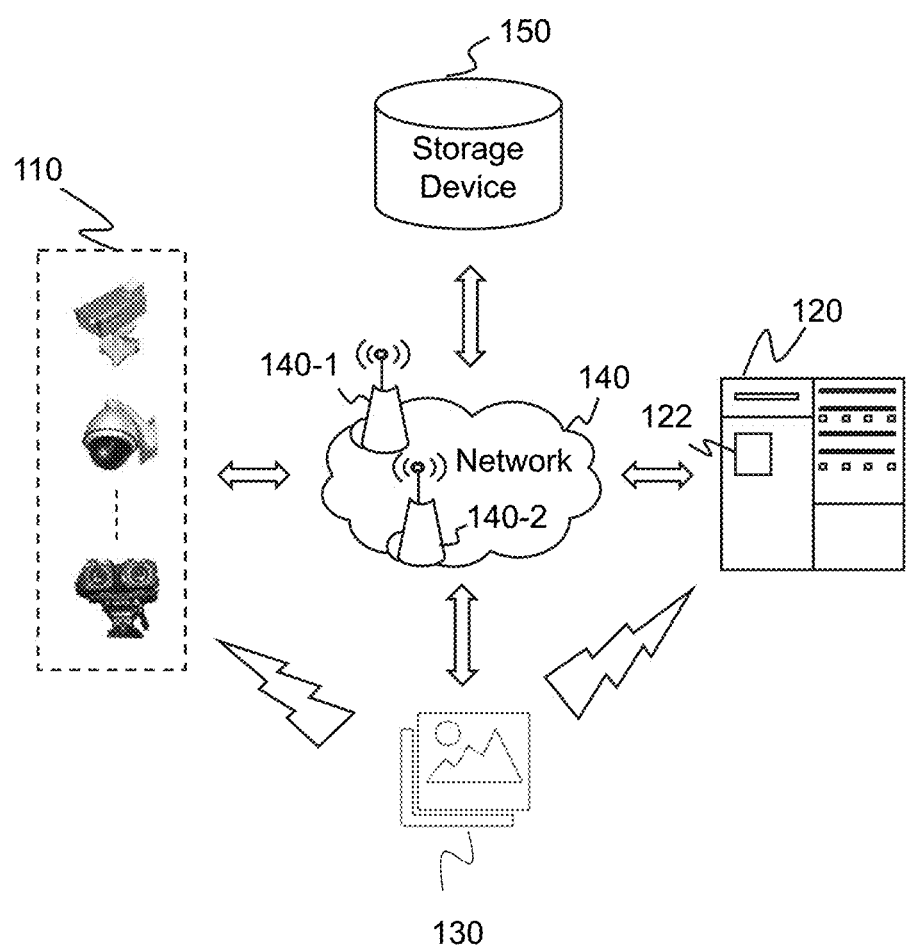
FIG. 1 is a schematic diagram illustrating an exemplary movement control system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be understood that the term "speed" used herein not only includes magnitude information but also includes moving direction information, that is, the term "speed" can be used interchangeably with the term "velocity." It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "unit," "module," and/or "block" used herein are one method to distinguish different components, elements, parts, sections or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for controlling a movement (e.g., a speed, a location, an acceleration) of a capture device used to track a moving object. The systems may control the movement of the capture device based on a control algorithm (also referred to as "speed control algorithm" or "acceleration and deceleration algorithm") including a first control algorithm (e.g., an exponential algorithm) and a second control algorithm (e.g., an S-shaped algorithm). The systems may determine a switching time point with respect to the first control algorithm and the second control algorithm based on at least one tracking parameter (e.g., a target speed, a target distance) associated with the moving object. The systems may accelerate (also referred to as a "first acceleration stage") a speed of the capture device from an initial speed (e.g., 0) to a first speed within a first acceleration time period from a start time point to the switching time point according to the first control algorithm, and then accelerate (also referred to as a "second acceleration stage") the speed of the capture device from the first speed to a second speed (e.g., a maximum speed of the capture device) within a second acceleration time period from the switching time point to an acceleration termination time point according to the second control algorithm. Further, in order to stop the movement of the capture device, the systems may decelerate the speed of the capture device from the second speed to the initial speed, which is inverse to an acceleration stage including the first acceleration stage and the second acceleration stage.

According to the systems and methods, the speed of the capture device in start stage is relatively large and the speed change with respect to time is relatively smooth, so that a vibration in images or videos can be avoided or reduced under relatively large multiples, thereby making a scene captured by the capture device stable during the movement of the capture device. Besides, the acceleration change with respect to time is substantially consistent with the output torque change of a stepper motor of the capture device with respect to speed, making that a step-out state of the stepper motor can be efficiently avoided or reduced and the output torque of the stepper motor can be efficiently utilized. In addition, a combination of the exponential algorithm and the S-shaped algorithm can ensure that the speed of the capture device can be quickly accelerated to the first speed according to the exponential algorithm in the first acceleration stage and then be quickly accelerated to the second speed according to the S-shaped algorithm in the second acceleration stage.

In some embodiments, upon the determination of the switching time point, one or more supplementary parameters may be taken into consideration, for example, an external load applied to the capture device, a computing load associated with the capture device, etc. Accordingly, different switching time points can be adaptively selected for different application scenarios and the computing source utilization of the systems can be improved.

FIG. 1 is a schematic diagram illustrating an exemplary movement control system according to some embodiments of the present disclosure. In some embodiments, the movement control system 100 may include a capture device 110, a server 120, a network 140, and a storage device 150. In some embodiments, the movement control system 100 may be applied in various fields, such as security and surveillance, augmented reality, traffic control. For example, the movement control system 100 may be configured to control a movement (e.g., a speed, a location, an acceleration) of the capture device 110 for tracking a moving object (e.g., a vehicle, a driver of the vehicle, a passenger in the vehicle, a pedestrian, a robot).

The capture device 110 may be configured to track objects (e.g., a moving object) by capturing images or videos 130 thereof. In some embodiments, the capture device 110 may be driven to move to track the objects. In some embodiments, the movement of the capture device 110 may be driven by a pan-tilt-zoom (PTZ) system. For example, the PTZ system may include a stepper motor configured to drive and/or control the movement of the capture device 110 (or the PTZ system). In some embodiments, the PTZ system may be connected to or communicate with the server 120. Accordingly, the PTZ system may obtain control instructions from the server 120 and drive the capture device 110. In some embodiments, a control algorithm, including a first control algorithm (e.g., an exponential algorithm) and a second control algorithm (e.g., an S-shaped algorithm), may be used to control the movement of the stepper motor (or the PTZ system, the capture device 110). Specifically, the speed of the capture device 110 may be accelerated (also referred to as a "first acceleration stage") according to the first control algorithm and then be accelerated (also referred to as a "second acceleration stage") according to the second control algorithm. In some situations, in order to stop the capture device 110, the speed of the capture device 110 may be decelerated (also referred to as a "deceleration stage"), which is inverse to an acceleration stage including the first acceleration stage and the second acceleration stage. More descriptions regarding the control algorithm may be found elsewhere in the present disclosure (e.g., FIGS. 5A and 5B and the descriptions thereof).

In some embodiments, the capture device 110 may include a camera, a video recorder, an image sensor, a smartphone, a tablet computer, a laptop computer, a wearable device, or the like, or any combination thereof. The camera may include a box camera, a gun camera, a dome camera, an integrated camera, a monocular camera, a binocular camera, a multi-sensor camera, or the like, or any combination thereof. The video recorder may include a PC Digital Video Recorder (DVR), an embedded DVR, or the like, or any combination thereof. The image sensor may include a Charge Coupled Device (CCD), a Complementary Metal Oxide Semiconductor (CMOS), or the like, or any combination thereof.

The server 120 may be a single server or a server group. The server group may be centralized or distributed (e.g., the server 120 may be a distributed system). In some embodiments, the server 120 may be local or remote. For example, the server 120 may access information and/or data stored in the capture device 110 and/or the storage device 150 via the network 140. As another example, the server 120 may be directly connected to the capture device 110 and/or the storage device 150 to access stored information and/or data. In some embodiments, the server 120 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 120 may be implemented on a computing device 200 including one or more components illustrated in FIG. 2 of the present disclosure.

In some embodiments, the server 120 may include a processing device 122. The processing device 122 may process information and/or data associated with movement control and/or object tracking to perform one or more functions described in the present disclosure. For example, the processing device 122 may control the movement of the capture device 110 (or the PTZ system) to track a moving object based on a control algorithm and at least one tracking parameter (e.g., a target speed, a target distance between an initial location of the capture device 110 and a target location) associated with the moving object. As described above, the control algorithm may include a first control algorithm (e.g., an exponential algorithm) and a second control algorithm (e.g., an S-shaped algorithm), wherein the two control algorithms may correspond to a switching time point which may refer to a time point when the two control algorithms are switched to control the movement of the capture device 110.

In some embodiments, the processing device 122 may include one or more processing engines (e.g., single-core processing engine(s) or multi-core processor(s)). Merely by way of example, the processing device 122 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the server 120 may be connected to the network 140 to communicate with one or more components (e.g., the capture device 110, the storage device 150) of the movement control system 100. In some embodiments, the server 120 may be directly connected to or communicate with one or more components (e.g., the capture device 110, the storage device 150) of the movement control system 100.

The network 140 may facilitate exchange of information and/or data. In some embodiments, one or more components (e.g., the capture device 110, the server 120, the storage device 150) of the movement control system 100 may transmit information and/or data to other component(s) of the movement control system 100 via the network 140. For example, the server 120 may obtain at least one tracking parameter associated with a moving object from the storage device 150 via the network 140. As another example, the server 120 may obtain a control algorithm from the storage device 150 via the network 140. In some embodiments, the network 140 may be any type of wired or wireless network, or combination thereof. Merely by way of example, the network 140 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 140 may include one or more network access points. For example, the network 140 may include wired or wireless network access points (e.g., a point 140-1, a point 140-2), through which one or more components of the movement control system 100 may be connected to the network 140 to exchange data and/or information.

The storage device 150 may store data and/or instructions. In some embodiments, the storage device 150 may store data obtained from the capture device 110, the server 120, an external storage device, etc. For example, the storage device 150 may store information associated with a movement of the capture device 110 determined by the server 120. In some embodiments, the storage device 150 may store data and/or instructions that the server 120 may execute or use to perform exemplary methods described in the present disclosure. For example, the storage device 150 may store instructions that the movement control system 100 may execute or use to obtain at least one tracking parameter associated with a moving object and/or a control algorithm. As another example, the storage device 150 may store instructions that the movement control system 100 may execute or use to control a movement of the capture device 110 based on the control algorithm and the at least one tracking parameter.

In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more components (e.g., the capture device 110, the server 120) of the movement control system 100. One or more components of the movement control system 100 may access the data or instructions stored in the storage device 150 via the network 140. In some embodiments, the storage device 150 may be directly connected to or communicate with one or more components (the capture device 110, the server 120) of the movement control system 100. In some embodiments, the storage device 150 may be part of the server 120. For example, the storage device 150 may be integrated into the server 120.

It should be noted that the movement control system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, other than the capture device 110, the control algorithm may be used to control movements of devices such as a timing device (e.g., a clock), a computer numerical control device, a printing device. As another example, the movement control system 100 may also include a user device (not shown) which may be configured to receive information and/or data from the capture device 110, the server 120, and/or the storage device 150. The user device may provide a user interface via which a user may view information and/or input data and/or instructions to the movement control system 100.

Figure 2:
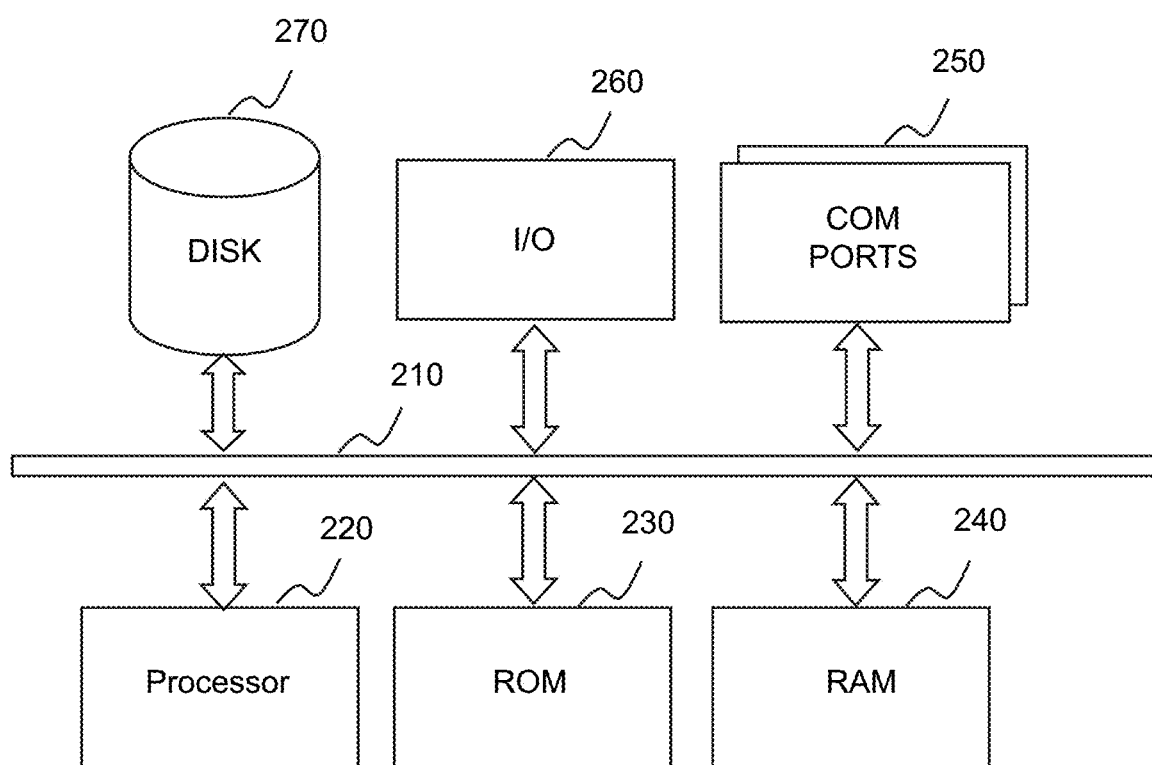
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the movement control system 100 as described herein. For example, the processing device 122 may be implemented on the computing device 200, via its hardware, software program, firmware, or a combination thereof. Although only one such computer is shown, for convenience, the computer functions relating to movement control and/or object tracking as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include one or more storages configured to store various data files (e.g., program instructions) to be processed and/or transmitted by the computing device 200. In some embodiments, the one or more storages may include a high speed random access memory (not shown), a non-volatile memory (e.g., a magnetic storage device, a flash memory, or other non-volatile solid state memories) (not shown), a disk 270, a read-only memory (ROM) 230, or a random-access memory (RAM) 240, or the like, or any combination thereof. In some embodiments, the one or more storages may further include a remote storage corresponding to the processor 220. The remote storage may connect to the computing device 200 via the network 140. The computing device 200 may also include program instructions stored in the one or more storages (e.g., the ROM 230, RAM 240, and/or another type of non-transitory storage medium) to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

Figure 3:
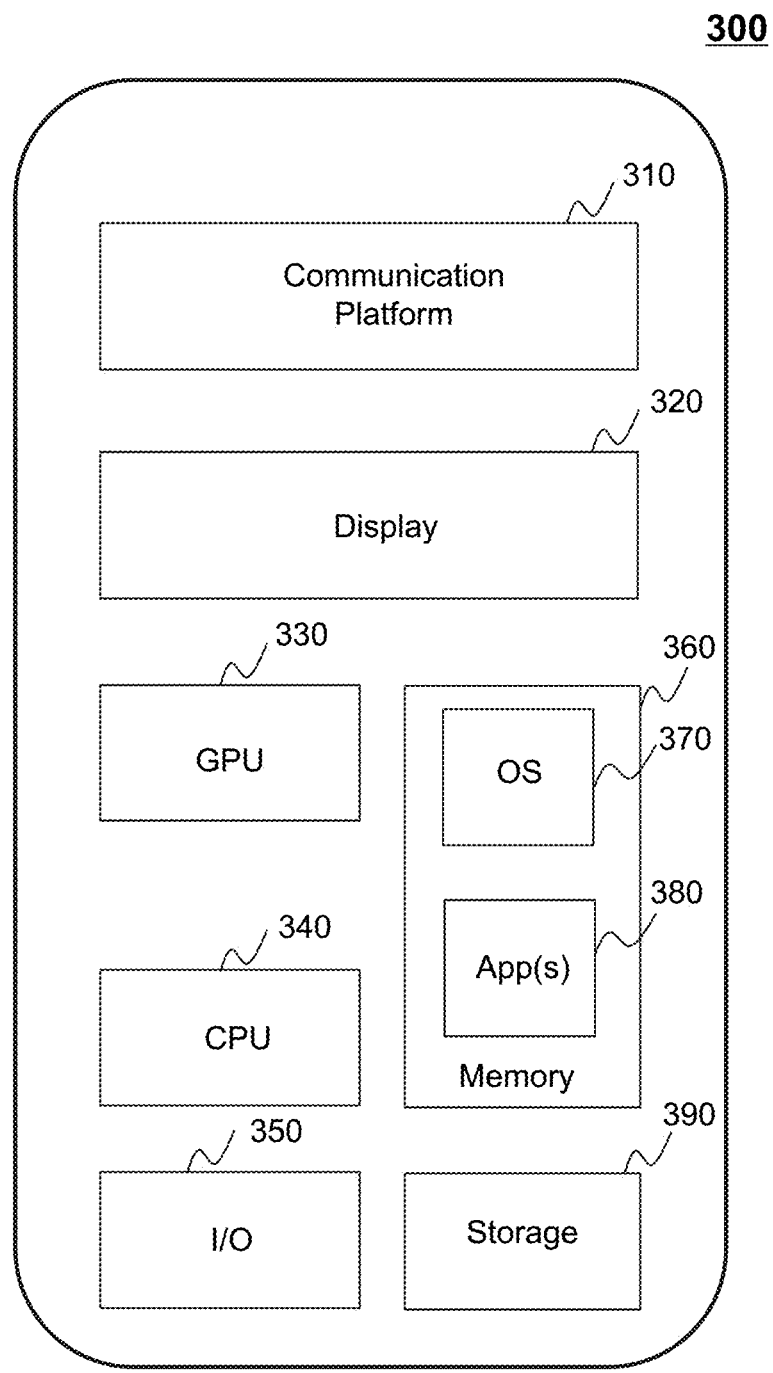
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the server 120 (e.g., the processing device 122) or the user device may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, a mobile operating system (OS) 370, and a storage 390. In some embodiments, any other suitable components, including but not limited to a system bus or a controller (not shown), may also be in the mobile device 300.

In some embodiments, the mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to movement control and/or object tracking or other information from the movement control system 100. User interactions with the information stream may be achieved via the I/O 350 and provided to the processing device 122 and/or other components of the movement control system 100 via the network 140.

Figure 4:
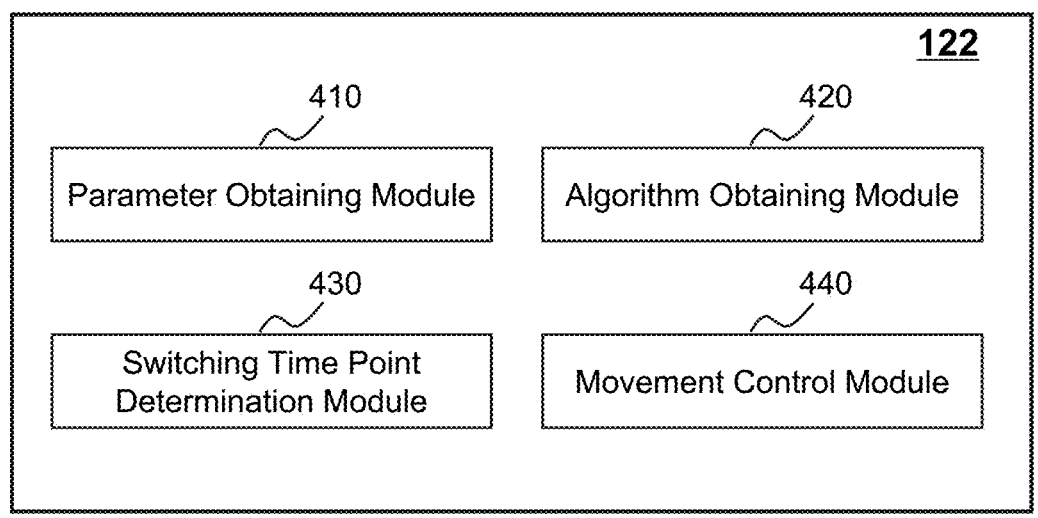
FIG. 4 is a block diagram illustrating an exemplary processing device according to some embodiments of the present disclosure.

FIG. 4 is a block diagram illustrating an exemplary processing device according to some embodiments of the present disclosure. The processing device 122 may include a parameter obtaining module 410, an algorithm obtaining module 420, a switching time point determination module 430, and a movement control module 440.

The parameter obtaining module 410 may be configured to obtain at least one tracking parameter associated with a moving object. As described in connection with FIG. 1, a capture device (e.g., the capture device 110) may be driven to move to track the moving object. Accordingly, the at least one tracking parameter may include a target speed of the capture device, a target distance between an initial location of the capture device and a target location, etc. As used herein, the target speed may refer to a maximum speed that the capture device is driven to reach to track the moving object. The target distance may refer to a maximum distance that the capture device is driven to move to track the moving object, that is, the capture device is driven to stop at the target location.

The algorithm obtaining module 420 may be configured to obtain a control algorithm including a first control algorithm (e.g., an exponential algorithm) and a second control algorithm (e.g., an S-shaped algorithm) associated with the capture device. As described in connection with FIG. 1, the control algorithm may be used to control the movement (e.g., a speed, a location thereof) of the capture device. More descriptions regarding the control algorithm may be found elsewhere in the present disclosure (e.g., FIGS. 5A and 5B and the descriptions thereof).

The switching time point determination module 430 may be configured to determine a switching time point with respect to the first control algorithm and the second control algorithm based on the at least one tracking parameter. The switching time point may refer to a time point when the two control algorithms (i.e., the first control algorithm and the second control algorithm) are switched to control the movement of the capture device. In some embodiments, the switching time point may include a time point (e.g., $T_e$ illustrated in FIGS. 5A and 5B) corresponding to a rise time parameter of the first control algorithm, a time point (e.g., $T_t$ illustrated in FIG. 5B) corresponding to a turning point (e.g., point 530-5 illustrated in FIG. 5B) of a torque-speed curve of the stepper motor of the capture device, etc.

In some embodiments, the switching time point determination module 430 may determine the switching time point based on the at least one tracking parameter with one or more supplementary parameters (e.g., computing load, stepout condition) taken into consideration. More descriptions regarding the determination of the switching time point based on the at least one tracking parameter and/or the one or more supplementary parameters may be found elsewhere in the present disclosure (e.g., FIG. 7 and the descriptions thereof).

The movement control module 440 may be configured to accelerate, according to the first control algorithm (e.g., 510-1 illustrated in FIG. 5A), a speed of the capture device from an initial speed (e.g., 0) to a first speed within a first acceleration time period from a start time point to the switching time point. The movement control module 440 may be configured further to accelerate, according to the second control algorithm (e.g., 510-2 illustrated in FIG. 5A), a speed of the capture device from the first speed to a second speed within a second acceleration time period from the switching time point to an acceleration termination time point.

That is, the first speed corresponds to a speed of the switching time point and the second speed corresponds to a speed of the acceleration termination time point. In some embodiments, the movement control module 440 may be configured to determine the first speed and/or the second speed based on the at least one tracking parameter according to the control algorithm (i.e., the first control algorithm and the second control algorithm). For example, the movement control module 440 may firstly determine the second speed based on the target speed and/or the target distance included in the at least one tracking parameter, which may be described in detail below and in the descriptions of FIGS. 11-12C, and then determine the first speed according to formulas (1) and (2) illustrated in FIGS. 5A and 5B.

In some embodiments, in order to stop the movement of the capture device, the movement control module 440 may be configured to decelerate the speed of the capture device from the second speed to the initial speed, which is inverse to the acceleration stage. For example, the movement control module 440 may be configured to decelerate, according to the second control algorithm, the speed of the capture device from the second speed to the first speed within a first deceleration time period and further decelerate, according to the first control algorithm, the speed of the capture device from the first speed to the initial speed within a second deceleration time period. In some embodiments, before stopping the movement of the capture device and after the acceleration stage is terminated, the movement control module 440 may control the capture device to move with the second speed (also referred to as "the uniform speed stage"). More descriptions regarding the movement control of the capture device may be found elsewhere in the present disclosure (e.g., FIGS. 5A and 12C and the descriptions thereof).

The modules in the processing device 122 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the parameter obtaining module 410 and the algorithm obtaining module 420 may be combined as a single module which may obtain the at least one tracking parameter and the control algorithm. As another example, the processing device 122 may include a storage module (not shown) which may be used to store data generated by the above-mentioned modules.

Figure 5A:
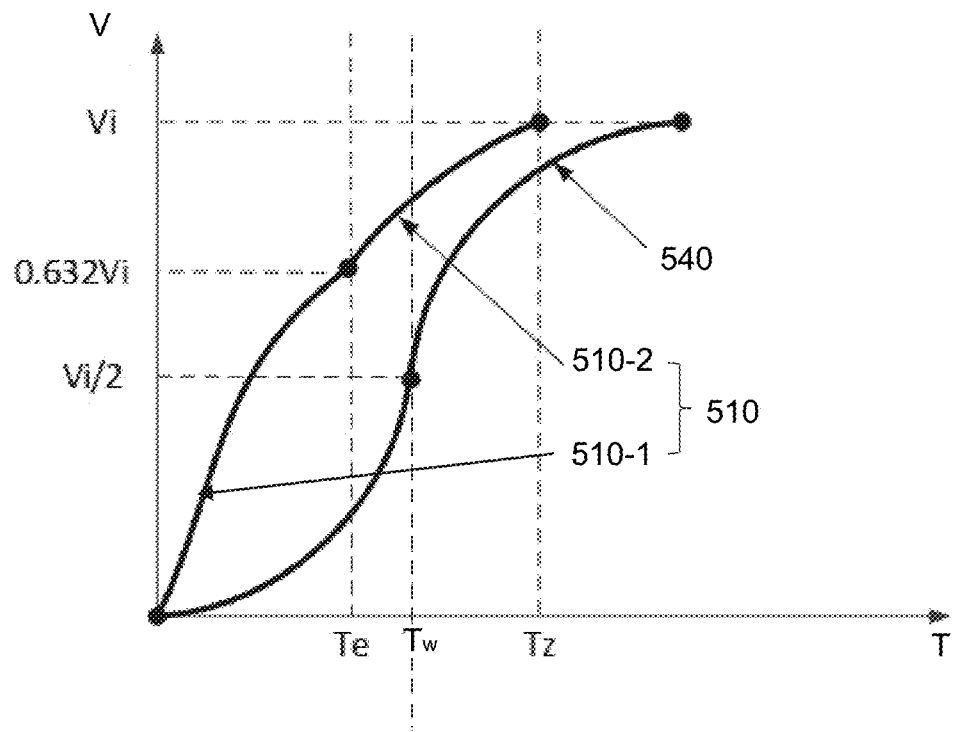
FIG. 5A is a schematic diagram illustrating exemplary speed-time curves of control algorithms according to some embodiments of the present disclosure.
Figure 5B:
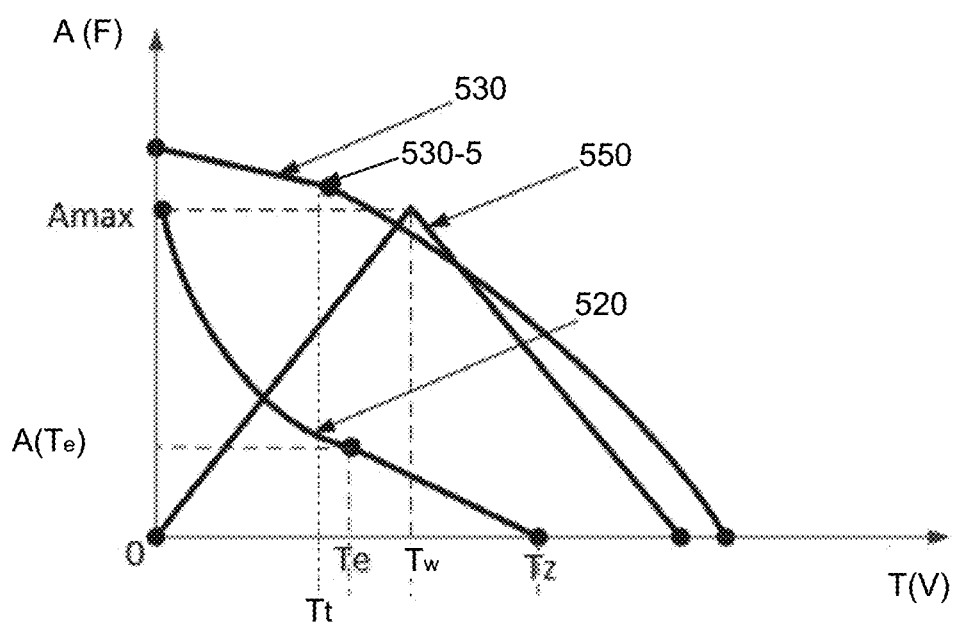
FIG. 5B is a schematic diagram illustrating exemplary acceleration-time (or torque-speed) curves of control algorithms according to some embodiments of the present disclosure.

FIG. 5A is a schematic diagram illustrating exemplary speed-time curves of control algorithms according to some embodiments of the present disclosure. FIG. 5B is a schematic diagram illustrating exemplary acceleration-time (or torque-speed) curves of control algorithms according to some embodiments of the present disclosure.

As described in connection with FIG. 1, a control algorithm, including a first control algorithm (e.g., an exponential algorithm) and a second control algorithm (e.g., an S-shaped algorithm), may be used to control a movement of a capture device (e.g., the capture device 110) for tracking a moving object. The movement of the capture device may include an acceleration stage, a deceleration stage, and/or a uniform speed stage. The acceleration stage may include a first acceleration stage in which a speed of the capture device may be accelerated according to the first control algorithm and a second acceleration stage in which the speed of the capture device may be further accelerated according to the second control algorithm. As illustrated in FIG. 5A, a curve 510 represents a speed-time curve of the movement (which is controlled based on the control algorithm) of the capture device in the acceleration stage, wherein a section 510-1 represents a first speed-time curve of the movement (which is controlled based on the first control algorithm) of the capture device in the first acceleration stage and a section 510-2 represents a second speed-time curve of the movement (which is controlled based on the second control algorithm) of the capture device in the second acceleration stage. As illustrated in FIG. 5B, a curve 520 represents an acceleration-time curve (or torque-speed) of the movement (which is controlled based on the control algorithm) of the capture device in the acceleration stage.

In some embodiments, the speed-time curve (e.g., the curve 510) may be determined according to formulas (1) and (2) below:

$$V(t) = \begin{cases} V_i(1 - e^{-t/T_e}), & 0 \le t \le T_s \\ V(T_s) + a(T_s)(t - T_s) - \dfrac{j_{max}(t - T_s)^2}{2}, & T_s \le t \le T_z \end{cases} \quad (1)$$
$$(2)$$

where t refers to a time point, V(t) refers to a speed of the capture device at the time point t, $V_i$ refers to a maximum speed of the capture device during the acceleration stage, $T_e$ refers to a time point corresponding to a rise time parameter of the first control algorithm at the time point $T_e$ (i.e., t=$T_e$), the speed of the capture device can reach a predetermined percentage (e.g., 63.2%) of the maximum speed (i.e., V($T_e$) =0.632 $V_i$)), $T_s$ refers to a switching time point when the two control algorithms (i.e., the first control algorithm and the second control algorithm) are switched to control the movement of the capture device, V($T_s$) refers to a speed of the capture device at the switching time point $T_s$, a($T_s$) refers to an acceleration of the capture device at the switching time point $T_s$, $j_{max}$ refers to a maximum jerk (jerk refers to a rate at which the acceleration of the capture changes with respect to time) of the capture device, and $T_z$ refers to an acceleration termination time point (i.e., a time point when the acceleration stage ends).

In some embodiments, the acceleration-time (or torque-speed) curve (e.g., the curve 520) may be determined according to formulas (3) and (4) below:

$$a(t) = \begin{cases} \dfrac{dV(t)}{dt} = \dfrac{dV_i(1 - e^{-t/T_e})}{dt} = -V_i \times \left(-\dfrac{1}{T}\right) \times & (3) \\ \quad e^{-t/T_e} = \dfrac{V_i}{T_e} e^{-t/T_e} & 0 \le t \le T_s \\ \dfrac{dV(t)}{dt} = a(T_s) - j_{max}(t - T_s), & T_s \le t \le T_z \end{cases} \quad (4)$$

where a(t) refers to an acceleration of the capture device at time point t. As illustrated in FIG. 5B, a maximum acceleration of the capture device at time point 0 (i.e., t=0) is associated with the maximum speed and the rise time parameter of the first control algorithm $$\left(\text{e.g., } A_{max} = \dfrac{V_i}{T_e}\right).$$

In some embodiments, a moving distance of the capture device at a time point t may be determined according to formulas (5) and (6) below:

$$S(t) = \begin{cases} \int_0^t V_i(1 - e^{-t/T_e})dt = V_i t + V_i T_e \int_0^t \left(e^{-t/T_e}\right) & (5) \\ d(-t/T_e) = \left[V_i t + V_i T_e e^{-t/T_e}\right]_0^t = & 0 \le t \le T_s \\ V_i t + V_i T_e(e^{-t/T_e} - 1) \\ \int_0^t V(T_s) + a(T_s)(t - T_s) - \dfrac{j_{max}(t - T_s)^2}{2} dt = \\ V(T_s)(t - T_s) + \dfrac{1}{2}a(T_s)(t - T_s)^2 - \dfrac{1}{6}j_{max}(t - T_s)^3, & T_s \le t \le T_z \end{cases} \quad (6)$$

where S(t) refers to a moving distance at a time point t.

In some embodiments, the rise time parameter (i.e., $T_e$) of the first control algorithm may be determined according to formulas (7) and (8) below:

$$A_{max} = \dfrac{NT_m - T_L - f}{J \times \eta} \quad (7)$$

$$T_e = \dfrac{V_i}{A_{max}} = \dfrac{V_i \times J}{NT_m - T_L - f} \quad (8)$$

where N refers to a transmission ratio of a PTZ system of the capture device, $T_m$ refers to a maximum output torque of the stepper motor of the capture device, $T_L$ refers to a load torque associated with the capture device, f refers to a friction torque associated with the capture device (e.g., associated with a friction torque of the stepper motor, a friction torque of the PTZ system), J refers to a moment of inertia of the capture device, and η refers to a safety factor (e.g., 2).

In some embodiments, according to formulas (1) and (3), the termination time point (i.e., $T_z$) and the maximum jerk (i.e., $j_{max}$) may be determined according to formulas (9)-(11) below:

$$(T_z - T_s) \times a_s/2 = V_i - V_s \quad (9)$$

$$T_z = T_s + \frac{2V_i}{\frac{V_i}{T_e}} = T_s + 2T_e \quad (10)$$

$$j_{max} = \frac{a_s}{2T_e} \quad (11)$$

It can be seen from the above formulas that if the switching time point (i.e., $T_s$) is known, one or more control parameters (e.g., a speed, an acceleration, a moving distance) for controlling the movement of the capture device may be determined based on the formulas described above.

In some embodiments, it is assumed that the switching time point is determined as the time point corresponding to the rise time parameter of the first control algorithm (i.e., $T_s=T_e$), the one or more control parameters may be determined according to formula (12) below:

$$V(T_s) = 0.632 V_i; \quad (12)$$

$$a(T_s) == \frac{0.368 V_i}{T_e};$$

$$S_{a_e} = 0.368 V_i T_e = \frac{0.368 V_i^2}{A_{max}};$$

$$S_{a_s} = V(T_e)(t - T_e) + \frac{1}{2}a(T_e)(t - T_e)^2 - \frac{1}{6}j_{max}(t - T_e)^3$$

$$= 0.632 V_i \left(\frac{2V_i}{A_{max}}\right) + \frac{1}{2} \times 0.368 A_{max} \left(\frac{2V_i}{A_{max}}\right)^2 - \frac{1}{6}$$

$$= 1.264 \frac{V_i^2}{A_{max}} + 0.763 \frac{V_i^2}{A_{max}} - 0.245 \frac{V_i^2}{A_{max}} = 1.755 \frac{V_i^2}{A_{max}};$$

$$S_a = S_{a_e} + S_{a_s} == \frac{0.368 V_i^2}{A_{max}} + 1.755 \frac{V_i^2}{A_{max}} = 2.123 \frac{V_i^2}{A_{max}}$$

where $S_a$ refers to an acceleration distance that the capture device moves in the acceleration stage, $S_{a_e}$ refers to a first acceleration distance that the capture device moves in the first acceleration stage, $S_{a_s}$ refers to a second acceleration distance that the capture device moves in the second acceleration stage, and "0.632" and "0.368" are predetermined intrinsic parameters of the movement control system 100.

As illustrated in FIG. 5A, a curve 540 represents a speed-time curve of a movement of the capture device in an acceleration stage ($T_w$ refers to a time point when the capture device has a maximum acceleration), which is controlled based on an S-shaped algorithm. It can be seen that the speed of the capture device accelerated according to the first control algorithm (e.g., the exponential algorithm) increases more quickly than that accelerated according to the S-shaped algorithm in the first acceleration stage. As illustrated in FIG. 5B, a curve 550 represents an acceleration-time (or torque-speed) curve of the movement of the capture device in the acceleration stage, which is controlled based on the S-shaped algorithm; a curve 530 refers to a torque-speed curve of the stepper motor. It can be seen that the acceleration-time curve of a movement of the capture device controlled based on the control algorithm (which may be a combination of an exponential algorithm and an S-shaped algorithm) matches the torque-speed curve of the stepper motor better than that controlled based on the S-shaped algorithm. The better the acceleration-time curve of the movement of the capture device matches the torque-speed curve of the stepper motor, the smaller probability that a step-out state of the stepper motor occurs may be. That is, the combination of the first control algorithm and the second control algorithm can reduce the probability that the step-out state of the stepper motor occurs. Besides, the speed of the capture device in start stage (e.g., the first acceleration stage) is relatively large, so that the capture device can accurately track a moving object (e.g., an airplane, a car) with a relatively high speed.

Figure 6:
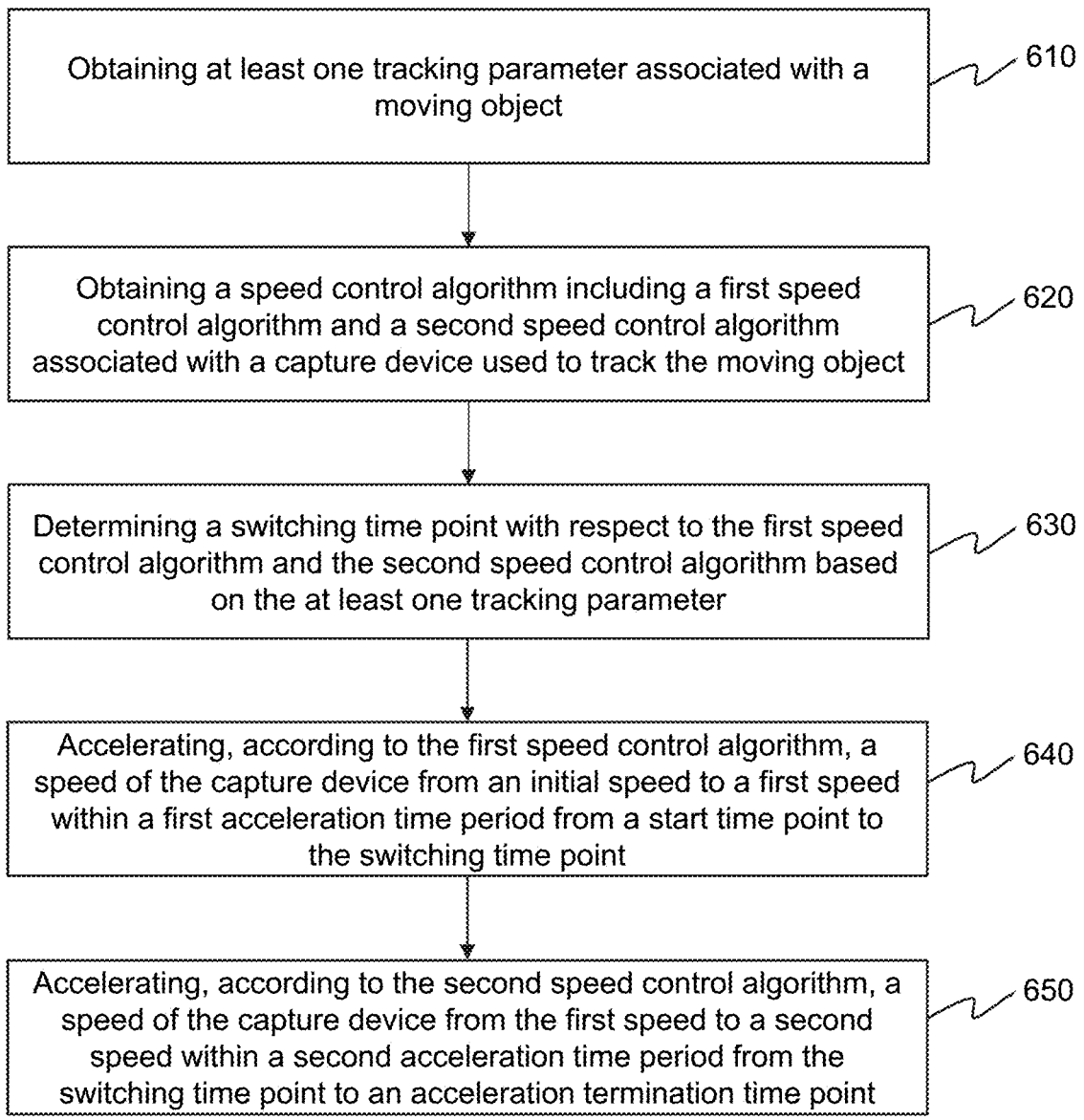
FIG. 6 is a flowchart illustrating an exemplary process for controlling a movement of a capture device based on a control algorithm including a first control algorithm and a second control algorithm according to some embodiments of the present disclosure.

FIG. 6 is a flowchart illustrating an exemplary process for controlling a movement of a capture device based on a control algorithm including a first control algorithm and a second control algorithm according to some embodiments of the present disclosure. In some embodiments, the process 600 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process illustrated in FIG. 6 and described below is not intended to be limiting.

In 610, the processing device 122 (e.g., the parameter obtaining module 410) (e.g., the interface circuits of the processor 220) may obtain at least one tracking parameter associated with a moving object.

In some embodiments, the moving object may include a vehicle, a passenger of the vehicle, a driver of the vehicle, a pedestrian, a robot, or the like, or a combination thereof. The vehicle may include a taxi, a private car, a hitch, a bus, a train, a bullet train, a high-speed rail, a subway, a vessel, an aircraft, a spaceship, a hot-air balloon, a driverless vehicle, or the like, or any combination thereof.

As described in connection with FIG. 1, a capture device (e.g., the capture device 110) may be driven to move to track the moving object. Accordingly, the at least one tracking parameter may include a target speed of the capture device, a target distance between an initial location of the capture device and a target location, etc. As used herein, the target speed may refer to a maximum speed that the capture device is driven to reach to track the moving object. The target distance may refer to a maximum distance that the capture device is driven to move to track the moving object, that is, the capture device is driven to stop at the target location. In some embodiments, the at least one tracking parameter may be default settings of the movement control system 100 or may be adjustable under different situations. For example, the larger a moving speed of the moving object is, the larger the target distance and/or the target speed associated with the moving object may be.

In 620, the processing device 122 (e.g., the algorithm obtaining module 420) (e.g., the interface circuits of the processor 220) may obtain a control algorithm including a first control algorithm (e.g., an exponential algorithm) and a second control algorithm (e.g., an S-shaped algorithm) associated with the capture device. As described in connection with FIG. 1 or FIGS. 5A and 5B, the control algorithm may be used to control the movement (e.g., a speed, a location thereof) of the capture device. More descriptions regarding the control algorithm may be found elsewhere in the present disclosure (e.g., FIGS. 5A and 5B and the descriptions thereof). In some embodiments, formulas and/or curves (e.g., the formulas and/or curves described in FIGS. 5A and 5B) associated with the control algorithm may be predetermined by the movement control system 100 or a system independent from the movement control system 100 and be stored in the storage device 150 or an external storage device.

In 630, the processing device 122 (e.g., the switching time point determination module 430) (e.g., the processing circuits of the processor 220) may determine a switching time point with respect to the first control algorithm and the second control algorithm based on the at least one tracking parameter. As described in connection with FIGS. 5A and 5B, the switching time point may refer to a time point when the two control algorithms (i.e., the first control algorithm and the second control algorithm) are switched to control the movement of the capture device. In some embodiments, the switching time point may include a time point (e.g., $T_e$ illustrated in FIGS. 5A and 5B) corresponding to a rise time parameter of the first control algorithm, a time point (e.g., $T_t$ illustrated in FIG. 5B) corresponding to a turning point (e.g., point 530-5 illustrated in FIG. 5B) of the torque-speed curve of the stepper motor of the capture device, etc.

In some embodiments, the time point corresponding to the rise time parameter of the first control algorithm can be obtained based on intrinsic parameters of the movement control system 100 (e.g., intrinsic parameters associated with capture device 110), which requires relatively small computing load. Accordingly, if the switching time point is determined as the time point corresponding to the rise time parameter of the first control algorithm, a computing load used for determining the one or more control parameters (e.g., a speed, an acceleration, a moving distance) for controlling the movement of the capture device is relatively small. Thus, the consumption of a computing device (e.g., a central processing unit (CPU)) of the movement control system 100 is relatively small.

In some embodiments, as illustrated in FIG. 5B, since an output torque of the stepper motor of the capture device begins to decrease at the time point $T_t$, if the acceleration of the capture device cannot be reduced rapidly before the time point $T_t$, a step-out state of the stepper motor may be likely to occur and accordingly the tracking of the moving object may be inaccurate. Thus, if the switching time point is determined as the time point $T_t$ corresponding to the turning point of the torque-speed curve, the step-out state of the stepper motor can be efficiently avoided or reduced.

Accordingly, the processing device 122 may determine the switching time point based on the at least one tracking parameter with one or more supplementary parameters (e.g., computing load, step-out condition) taken into consideration. More descriptions regarding the determination of the switching time point based on the at least one tracking parameter and/or the one or more supplementary parameters may be found elsewhere in the present disclosure (e.g., FIG. 7 and the descriptions thereof).

In 640, the processing device 122 (e.g., the movement control module 440) (e.g., the processing circuits of the processor 220) may accelerate, according to the first control algorithm (e.g., 510-1 illustrated in FIG. 5A), a speed of the capture device from an initial speed (e.g., 0) to a first speed within a first acceleration time period from a start time point to the switching time point.

Further, in 650, the processing device 122 (e.g., the movement control module 440) (e.g., the processing circuits of the processor 220) may accelerate, according to the second control algorithm (e.g., 510-2 illustrated in FIG. 5A), a speed of the capture device from the first speed to a second speed within a second acceleration time period from the switching time point to an acceleration termination time point.

That is, the first speed corresponds to a speed of the switching time point and the second speed corresponds to a speed of the acceleration termination time point. In some embodiments, the first speed and/or the second speed may be determined based on the at least one tracking parameter according to the control algorithm (i.e., the first control algorithm and the second control algorithm). For example, the processing device 122 may firstly determine the second speed based on the target speed and/or the target distance that are included in the at least one tracking parameter, which may be described in detail below and in the descriptions of FIGS. 11-12C, and then determine the first speed according to formulas (1) and (2).

In some embodiments, the capture device may move a first acceleration distance within the first acceleration time period and a second acceleration distance within the second acceleration time period. The processing device 122 may determine a moving distance of the capture device based at least in part on the first acceleration distance and the second acceleration distance.

In some embodiments, in order to stop the movement of the capture device, the processing device 122 may also decelerate the speed of the capture device from the second speed to the initial speed, which is inverse to the acceleration stage. For example, the processing device 122 may decelerate, according to the second control algorithm, the speed of the capture device from the second speed to the first speed within a first deceleration time period and further decelerate, according to the first control algorithm, the speed of the capture device from the first speed to the initial speed within a second deceleration time period.

In some embodiments, the capture device may move a first deceleration distance within the first deceleration time period and a second deceleration distance within the second deceleration time period. Accordingly, the processing device 122 may determine the moving distance of the capture device based at least in part on the first acceleration distance, the second acceleration distance, the first deceleration distance, and the second deceleration distance.

In some embodiments, at least one of the moving distance or the second speed of the capture device may satisfy the at least one tracking parameter. For example, the at least one tracking parameter may include the target speed, accordingly, the second speed of the capture device may be equal to or substantially equal to the target speed. In this situation, after accelerating the speed of the capture device to the second speed (i.e., the target speed), that is, after the acceleration stage is terminated, the processing device 122 may control the capture device to move with the second speed (also referred to as "the uniform speed stage"). Upon receiving an instruction of stopping the movement of the capture device (or stopping tracking the moving object), the processing device 122 may decelerate the speed of the capture device from the second speed to the initial speed (i.e., the deceleration stage). The above process can be referred to as a first movement control manner. In the first movement control manner, the moving distance of the capture device may be a sum of the first acceleration distance, the second acceleration distance, the first deceleration distance, the second deceleration distance, and a distance (also referred to as "uniform speed distance") that the capture device moves in the uniform speed stage. More descriptions regarding the first movement control manner may be found elsewhere in the present disclosure (e.g., FIGS. 8 and 9 and the descriptions thereof).

As another example, the at least one tracking parameter may include the target speed and the target distance, accordingly, the moving distance of the capture device may be equal to or substantially equal to the target distance, and the second speed may be equal to or not equal to the target speed, which may be determined based on the target distance and the control algorithm. Specifically, the processing device 122 may compare a reference moving distance with the target distance. As used herein, the reference moving distance may include a reference acceleration distance and a reference deceleration distance. Similar to the acceleration distance and the deceleration distance, the reference deceleration distance may be equal to the reference acceleration distance. In some embodiments, the processing device 122 may determine the reference acceleration distance according to formulas (5)-(6) or formula (12) (it is assumed that "$T_s=T_e$") with the maximum speed designated as the target speed.

In response to determining that the reference moving distance is smaller than the target distance, the processing device 122 may designate the target speed as the second speed. Similarly, after accelerating the speed of the capture device to the second speed (i.e., the target speed), that is, the acceleration stage is terminated, the processing device 122 may control the capture device to move with the second speed for a uniform speed distance. Upon determining that the uniform speed distance is equal to a difference between the target distance and the reference moving distance, the processing device 122 may decelerate the speed of the capture device from the second speed to the initial speed (i.e., the deceleration stage). The above process can be referred to as a second movement control manner. In the second movement control manner, the moving distance of the capture device may be a sum of the first acceleration distance, the second acceleration distance, the first deceleration distance, the second deceleration distance, and the uniform speed distance, which is equal to the target distance. More descriptions regarding the second movement control manner may be found elsewhere in the present disclosure (e.g., FIGS. 11-12C and the descriptions thereof).

In response to determining that the reference moving distance is equal to the target distance, the processing device 122 may designate the target speed as the second speed. Similarly, after accelerating the speed of the capture device to the second speed (i.e., the target speed), that is, the acceleration stage is terminated, the processing device 122 may decelerate the speed of the capture device from the second speed to the initial speed (i.e., the deceleration stage). The above process can be referred to as a third movement control manner. In the third movement manner, the moving distance of the capture device may be a sum of the first acceleration distance, the second acceleration distance, the first deceleration distance, and the second deceleration distance, which is equal to the target distance. More descriptions regarding the third movement control manner may be found elsewhere in the present disclosure (e.g., FIGS. 11-12C and the descriptions thereof).

In response to determining that the reference moving distance is larger than the target distance, the processing device 122 may determine the second speed based on the target distance and the control algorithm, which is not equal to the target speed. That is, an updated target speed is determined and used to control the movement of the capture device. More descriptions regarding the determination of the second speed based on the target distance and the control algorithm may be found elsewhere in the present disclosure (e.g., FIG. 10 and the descriptions thereof). Similarly, after accelerating the speed of the capture device to the second speed (i.e., the updated target speed), that is, the acceleration stage is terminated, the processing device 122 decelerate the speed of the capture device from the second speed to the initial speed (i.e., the deceleration stage). The above process can be referred to as a fourth movement control manner. In the fourth movement control manner, the moving distance of the capture device may be a sum of the first acceleration distance, the second acceleration distance, the first deceleration distance, and the second deceleration distance, which is equal to the target distance. More descriptions regarding the fourth movement control manner may be found elsewhere in the present disclosure (e.g., FIGS. 11-12C and the descriptions thereof).

In some embodiments, the control algorithm with the first control algorithm being an exponential algorithm and/or the movement control manner described above can be applied in relatively complicated scenarios (e.g., tracking an airplane, tracking a car) where the target speed (or the moving speed of the moving object) is relatively high. It should be understood that the control algorithm and/or the movement control manner described above also can be applied in other various scenarios.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the first control algorithm may include a T-shaped algorithm, and the speed of the capture device may increase linearly according to the T-shaped algorithm in the first acceleration stage, which may be applied in relatively simple scenarios (e.g., tracking the pedestrian) where the target speed is relatively low.

Figure 7:
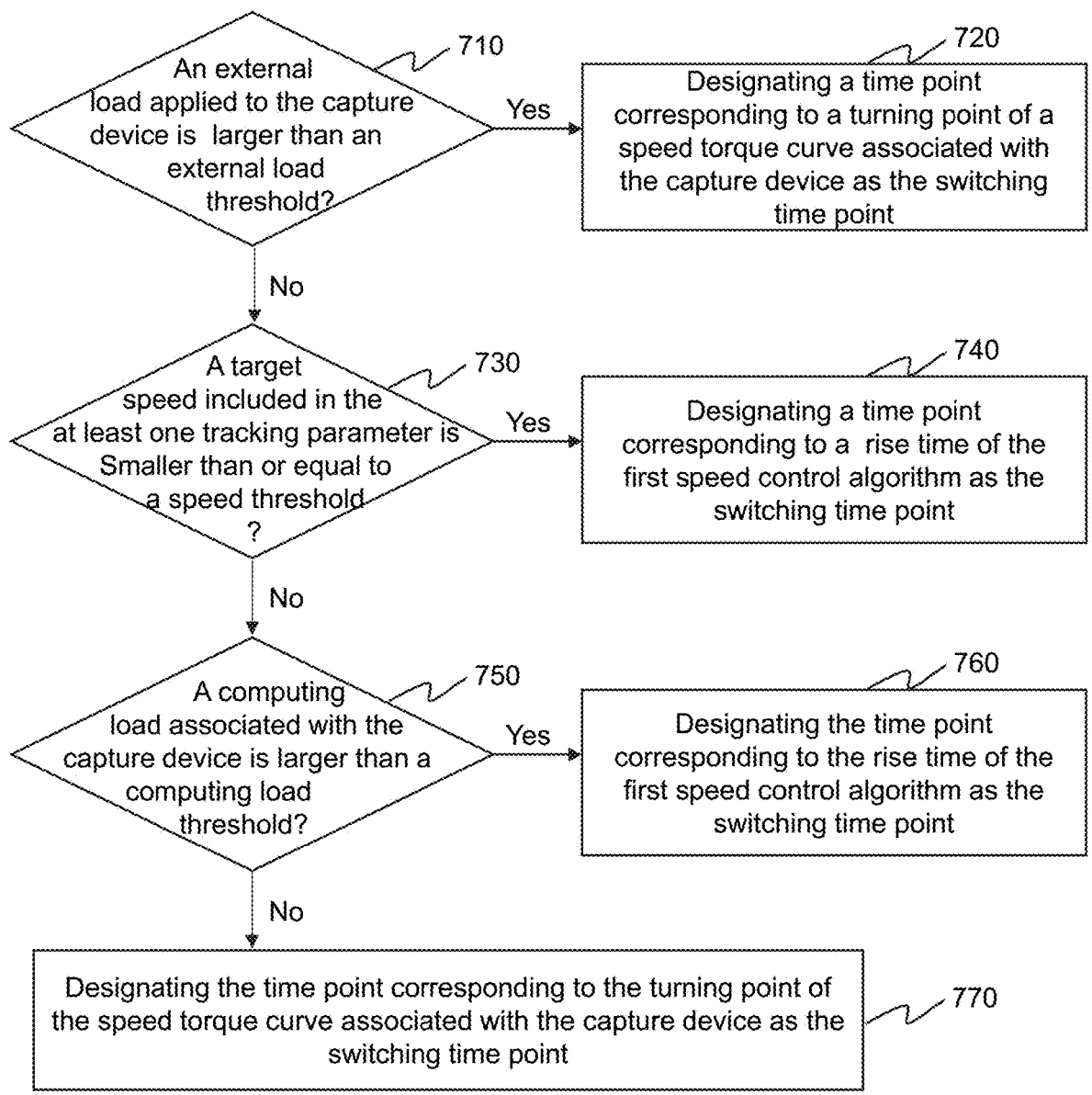
FIG. 7 is a flowchart illustrating an exemplary process for determining a switching time point with respect to a first control algorithm and a second control algorithm included in a control algorithm according to some embodiments of the present disclosure.

FIG. 7 is a flowchart illustrating an exemplary process for determining a switching time point with respect to a first control algorithm and a second control algorithm included in a control algorithm according to some embodiments of the present disclosure. In some embodiments, the process 700 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process illustrated in FIG. 7 and described below is not intended to be limiting.

In 710, the processing device 122 (e.g., the switching time point determination module 430) (e.g., the processing circuits of the processor 220) may determine whether an external load applied to the capture device is larger than an external load threshold.

In some embodiments, the external load may be caused by an external object (e.g., rain, snow, hail) attached to the capture device. For example, the external load may be determined via a sensor (e.g., a force sensor, a weather sensor) installed in the capture device. For example, if the weather sensor detects that a region where the capture device is installed is in heavy rain, heavy snow, or heavy hail, the processing device 122 may determine that the external load is larger than the external load threshold. In some embodiments, the external load threshold may be default settings of the movement control system 100 or may be adjustable under different situations.

Generally, in a condition (also referred to as a "first condition") that the external load is larger than the external load threshold, the load torque and/or the friction torque associated with the capture device may increase, causing a longer first acceleration time period compared with that determined in a condition (also referred to as a "second condition") that the external load is smaller than or equal to the external load threshold.

Accordingly, in 720, in response to determining that the external load is larger than the external load threshold, the processing device 122 (e.g., the switching time point determination module 430) (e.g., the processing circuits of the processor 220) may designate a time point (e.g., $T_t$ illustrated in FIG. 5B) corresponding to a turning point (e.g., point 530-5 illustrated in FIG. 5B) of a torque-speed curve (e.g., a torque-speed curve of a stepper motor) associated with the capture device as the switching time point, which can ensure that the speed of the capture device can be accelerated to the maximum speed quickly in the first acceleration time period and the first acceleration time period can be shortened, thereby reducing a probability that a step-out state of the stepper motor may occur and further improving monitoring accuracy.

In some embodiments, the processing device 122 may determine a speed of the capture device at the time point $T_t$ according to formula (13) below:

$$V_t = \theta \times \frac{f_t}{N_r} \quad (13)$$

where $V_t$ refers to the speed of the capture device at the time point $T_t$, $\theta$ refers to a step angle, $f_t$ refers to a pulse frequency at the time point $T_t$, and $N_r$ refers to a transmission ratio between the capture device and the stepper motor.

Further, the processing device 122 may determine the time point $T_t$ based on the speed of the capture device at the time point according to formula (1).

In 730, in response to determining that the external load is smaller than or equal to the external load threshold, the processing device 122 may determine whether a target speed included in the at least one tracking parameter is smaller than or equal to a speed threshold (e.g., the speed $V_t$ at the time point $T_t$ corresponding to a speed of the turning point).

In some embodiments, in a condition that the target speed is smaller than or equal to $V_t$, the output torque of the stepper motor may not sharply decrease during the acceleration stage of the capture device, which may indicate that the step-out state of the stepper motor is unlikely to occur. In addition, if the switching time point is designated as the time point (i.e., $T_e$) corresponding to the rise time parameter of the first control algorithm, the first acceleration stage is shorter than that if the switching time point is designated as the time point (i.e., $T_t$) corresponding to the turning point.

Accordingly, in 740, in response to determining that the target speed is smaller than or equal to the speed threshold, the processing device 122 may designate the time point (i.e., $T_e$) corresponding to the rise time parameter of the first control algorithm as the switching time point.

In 750, in response to determining that the target speed is larger than the speed threshold, the processing device 122 may determine whether a computing load associated with the capture device is larger than a computing load threshold. As used herein, the computing load associated with the capture device may refer to a current resource consumption rate of the movement control system 100. As described in connection with FIG. 6, if the switching time point is determined as the time point corresponding to the rise time parameter of the first control algorithm, a computing load (also can be referred to as "computing resource") used for determining the one or more control parameters for controlling the movement of the capture device may be smaller than that if the switching time point is determined as the time point corresponding to the turning point.

Accordingly, in 760, in response to determining that the computing load is larger than the computing load threshold, that is, available computing resource may be relatively low, the processing device 122 may designate the time point (i.e., $T_e$) corresponding to the rise time parameter of the first control algorithm as the switching time point.

In 770, in response to determining that the computing load is smaller than or equal to the computing load threshold, the processing device 122 may designate the time point corresponding to the turning point of the torque-speed curve as the switching time point.

Figure 9:
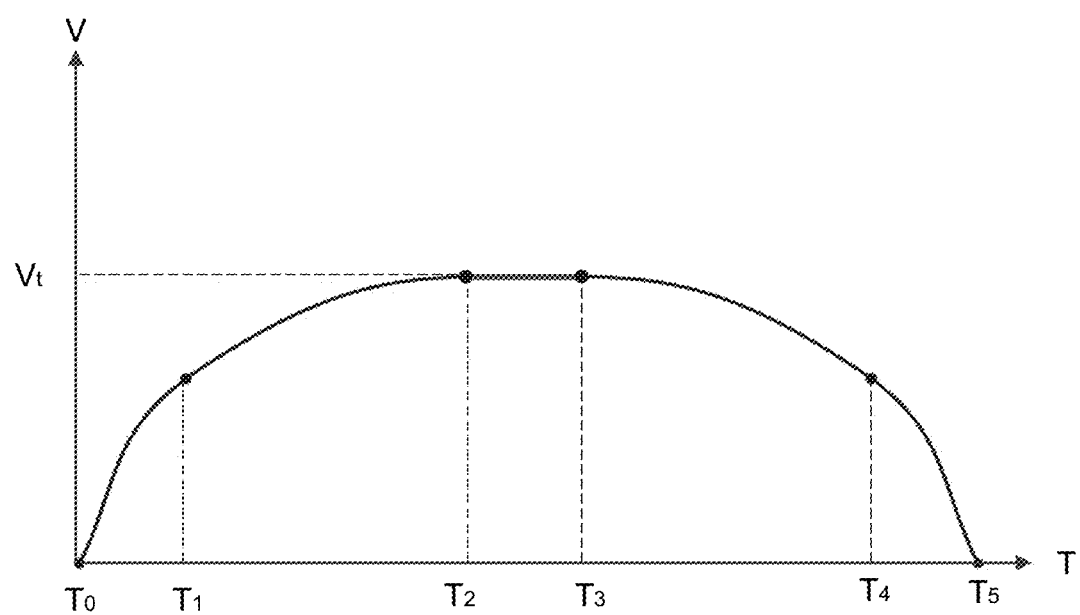
FIG. 9 is a schematic diagram illustrating an exemplary speed-time curve associated with a movement of a capture device according to some embodiments of the present disclosure.

FIG. 8-(1) and FIG. 8-(2) are a flowchart illustrating an exemplary process for controlling a movement of a capture device based on a control algorithm including a first control algorithm and a second control algorithm according to some embodiments of the present disclosure. FIG. 9 is a schematic diagram illustrating an exemplary speed-time curve associated with the movement of the capture device according to some embodiments of the present disclosure. In some embodiments, process 800 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform process 800. The operations of the illustrated process presented below are intended to be illustrative. In some embodiments, process 800 may be accomplished with one or more additional operations not described and/or without one or more of the operations herein discussed. Additionally, the order in which the operations of the process as illustrated in FIG. 8-(1) and FIG. 8-(2) and described below is not intended to be limiting.

In 801, after receiving an instruction of controlling a movement of a capture device in a consecutive movement mode based on a control algorithm including a first control algorithm and a second control algorithm, the processing device 122 (e.g., the movement control module 440) (e.g., the interface circuits of the processor 220) may obtain at least one tracking parameter with respect to the consecutive movement mode and a switching time point with respect to the first control algorithm and the second control algorithm. In some embodiments, the at least one tracking parameter with respect to the consecutive movement mode may include a target speed of the capture device.

In 802, the processing device 122 (e.g., the movement control module 440) (e.g., the interface circuits of the processor 220) may obtain one or more parameters associated with the capture device and determine a maximum acceleration of the capture device based on the one or more parameters. In some embodiments, the one or more parameters associated with the capture device may include a transmission ratio of a PTZ system of the capture device, a maximum output torque of a stepper motor of the capture device, a load torque associated with the capture device, a friction torque associated with the capture device (e.g., associated with a friction torque of the stepper motor, a friction torque of the PTZ system), a moment of inertia of the capture device, a safety factor (e.g., 2), etc. In some embodiments, the processing device 122 may determine the maximum acceleration of the capture device according to formula (7).

In 803, the processing device 122 (e.g., the movement control module 440) (e.g., the processing circuits of the processor 220) may determine a time point (i.e., $T_e$) corresponding to a rise time parameter of the first control algorithm and a maximum jerk (i.e., $j_{max}$) of the capture device under the second control algorithm. In some embodiments, the processing device 122 may determine the time point (i.e., $T_e$) corresponding to the rise time parameter of the first control algorithm according to formula (8); the processing device 122 may determine the maximum jerk (i.e., $j_{max}$) according to formulas (3) and (11). In some embodiments, according to formulas (10) and (11), it is assumed that the switching time point is designated as the time point (i.e., $T_e$) corresponding to the rise time parameter of the first control algorithm, the processing device 122 may determine an acceleration time length (i.e., a time length from time point (e.g., $T_0$ illustrated in FIG. 9) to an acceleration termination time point (i.e., $T_x$), also can be directly referred to as "$T_z$" for brevity) in which the speed of the capture device is accelerated from an initial speed to the target speed according to formulas (14) and (15) below:

$$j_{max} = \frac{0.368 A_{max}^2}{2 V_{max}} \quad (14)$$

$$T_z = 0.368 A_{max}/j_{max} + T_e \quad (15)$$

In 804, the processing device 122 (e.g., the movement control module 440) (e.g., the processing circuits of the processor 220) may determine a plurality of time points by discretizing the acceleration time length (i.e., $T_z$) according to a specified period (e.g., a predetermined smallest period). For example, if the specified period is 5 milliseconds, the time points may include 0 milliseconds, 5 milliseconds, 10 milliseconds, . . . , etc. Then the processing device 122 may determine a plurality of discrete pulse frequencies corresponding to the plurality of time points. In some embodiments, the plurality of time points may be arranged in sequence ($T_{d1}$, $T_{d2}$, $T_{d3}$, $T_{d4}$, . . . , $T_{dn}$). In some embodiments, the specified period may be default settings of the movement control system 100 or may be adjustable under different situations.

In 805, for any time point within a first acceleration time period (i.e., a period in which the capture device is controlled according to the first control algorithm) from a start time point (e.g., $T_0$ illustrated in FIG. 9) to the switching time point (e.g., $T_1$ illustrated in FIG. 9), the processing device 122 (e.g., the movement control module 440) (e.g., the processing circuits of the processor 220) may determine a speed of the capture device at the time point according to the first control algorithm.

In 806, the processing device 122 (e.g., the movement control module 440) (e.g., the interface circuits of the processor 220) may obtain an interrupting period of a timer. As used herein, a time length of the interrupting period may be equal to a time length of the specified period used to discrete the plurality of time points. In some embodiments, the processing device 122 may determine the speed of the capture device according to formula (1). Further, the processing device 122 may generate a pulse frequency corresponding to the speed of the capture device to drive the movement of the capture device based on the interrupting period. For example, the larger the speed of the capture device is, the larger the corresponding pulse frequency may be.

In 807, for any time point, the processing device 122 (e.g., the movement control module 440) (e.g., the processing circuits of the processor 220) may determine a current consecutive time length from the start time point to the current time point according to formula (16) below:

$$T_i = T_{i-1} + t \quad (16)$$

where $T_i$ refers to a time length from the start time point to the current time point, $T_{i-1}$ refers to a time length from the start time point to a previous time point with respect to the current time point, and t refers to the specified period (or the interrupting period).

In 808, the processing device 122 (e.g., the movement control module 440) (e.g., the processing circuits of the processor 220) may determine whether the time length is larger than a time length of the first acceleration time period (e.g., ($T_1 - T_0$) illustrated in FIG. 9). In response to determining that the time length is smaller than or equal to the time length of the first acceleration time period, the processing device 122 may proceed the process 800 back to operation 805.

In 809, in response to determining that the time length is larger than the time length of the first acceleration time period, that is, the movement control manner enters into a second acceleration time period in which the capture device is controlled according to the second control algorithm, accordingly, for any time point within the second acceleration time period, the processing device 122 (e.g., the movement control module 440) (e.g., the processing circuits of the processor 220) may determine a speed of the capture device at the time point according to the second control algorithm.

In 810, the processing device 122 (e.g., the movement control module 440) (e.g., the interface circuits of the processor 220) may obtain an interrupting period of a timer (e.g., the same one described in operation 806 or an independent one). In some embodiments, the processing device 122 may determine the speed of the capture device according to formula (2). Further, the processing device 122 may also generate a pulse frequency corresponding to the speed of the capture device to drive the movement of the capture device based on the interrupting period.

In 811, for any time point, the processing device 122 (e.g., the movement control module 440) (e.g., the processing circuits of the processor 220) may determine a current consecutive time length from the start time point to the current time point according to formula (16) above.

In 812, the processing device 122 (e.g., the movement control module 440) (e.g., the processing circuits of the processor 220) may determine whether the time length is larger than a time length of the second acceleration time period (e.g., ($T_2 - T_0$) illustrated in FIG. 9). In response to determining that the time length is smaller than or equal to the time length of the second acceleration time period, the processing device 122 may proceed the process 800 back to operation 809.

In 813, in response to determining that the time length is larger than the time length of the second acceleration time period, the processing device 122 (e.g., the movement control module 440) (e.g., the processing circuits of the processor 220) may control the capture device to move with the target speed.

In 814, upon receiving an instruction of stopping the movement of the capture device (or stopping tracking the moving object) at a time point (e.g., $T_3$ illustrated in FIG. 9), the processing device 122 (e.g., the movement control module 440) (e.g., the processing circuits of the processor 220) may decelerate the speed of the capture device within a deceleration time period from the time point (e.g., $T_3$) to a deceleration termination time point (e.g., $T_5$ illustrated in FIG. 9). For example, the processing device 122 may decelerate, according to the second control algorithm, the speed of the capture device from the target speed to the first speed within a first deceleration time period (e.g., a time period from $T_3$ to $T_4$) and further decelerate, according to the first control algorithm, the speed of the capture device from the first speed to the initial speed within a second deceleration time period (e.g., a time period from $T_4$ to $T_5$).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
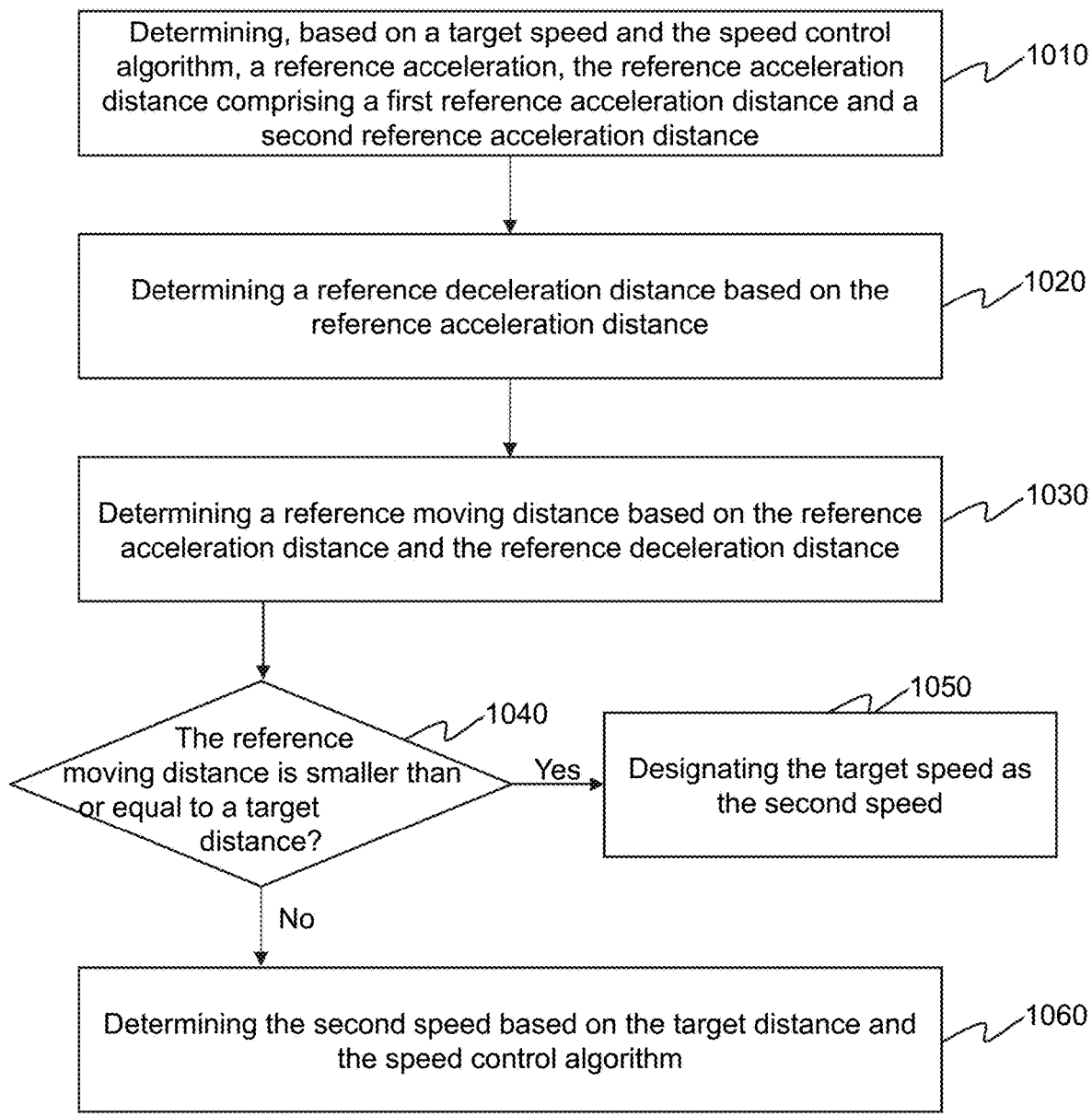
FIG. 10 is a flowchart illustrating an exemplary process for determining a second speed of a capture device in a condition that at least one tracking parameter includes a target speed and a target distance according to some embodiments of the present disclosure.

FIG. 10 is a flowchart illustrating an exemplary process for determining a second speed of a capture device in a condition that at least one tracking parameter includes a target speed and a target distance according to some embodiments of the present disclosure. In some embodiments, process 1000 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform process 1000. The operations of the illustrated process presented below are intended to be illustrative. In some embodiments, process 1000 may be accomplished with one or more additional operations not described and/or without one or more of the operations herein discussed. Additionally, the order in which the operations of the process illustrated in FIG. 10 and described below is not intended to be limiting.

In some embodiments, as described in connection with operation 640 or operation 650, the processing device 122 may control the speed of the capture device based on a control algorithm including a first control algorithm and a second control algorithm. According to the control algorithm and at least one tracking parameter (which predefined by the movement control system 100 or by a user), the processing device 122 may determine a second speed (i.e., a maximum speed) corresponding to a speed of an acceleration termination time point and further determine a first speed corresponding to a speed of a switching time point. In some embodiments, the at least one tracking parameter may both include a target speed and a target distance. Accordingly, the processing device 122 may control a moving distance of the capture device to be equal to the target distance, and control a maximum speed of the capture device to be equal to or not equal to the target distance, that is, the distance requirement is given a highest priority and the speed requirement can be adjusted under different situations, which may be described in detail below.

In 1010, the processing device 122 (e.g., the movement control module 440) (e.g., the processing circuits of the processor 220) may determine a reference acceleration distance based on the target speed and the control algorithm. As described in connection with operation 640 or operation 650, similar to the acceleration distance, the reference acceleration distance may include a first reference acceleration distance and a second reference acceleration distance. It is assumed that a switching time point with respect to the first control algorithm and the second control algorithm is a time point (i.e., $T_e$) corresponding to a rise time parameter of the first control algorithm, the processing device 122 may determine the reference acceleration distance according to formula (12).

In 1020, the processing device 122 (e.g., the movement control module 440) (e.g., the processing circuits of the processor 220) may determine a reference deceleration distance based on the reference acceleration distance. As described in connection with operation 640 or operation 650, similar to the acceleration distance and the deceleration distance, the reference deceleration distance may be equal to the reference acceleration distance.

In 1030, the processing device 122 (e.g., the movement control module 440) (e.g., the processing circuits of the processor 220) may determine a reference moving distance based on the reference acceleration distance and the reference deceleration distance. For example, the reference moving distance may be a sum of the reference acceleration distance and the reference deceleration distance. In some embodiments, it is assumed that a switching time point with respect to the first control algorithm and the second control algorithm is a time point (i.e., $T_e$) corresponding to a rise time parameter of the first control algorithm, the processing device 122 may determine the reference moving distance $S_r$ according to formula (17) below:

$$S_r = 2\left(\frac{0.368 V_r^2}{A_{max}} + 1.755 \frac{V_r^2}{A_{max}}\right) = 4.246 \frac{V_r^2}{A_{max}} \quad (17)$$

where $S_r$ refers to the reference moving distance and $V_r$ refers to the target speed.

In 1040, the processing device 122 (e.g., the movement control module 440) (e.g., the processing circuits of the processor 220) may determine whether the reference moving distance is smaller than or equal to the target distance.

In 1050, in response to determining that the reference moving distance is smaller than or equal to the target distance, that is, the distance requirement can be met under the target speed condition, accordingly, the processing device 122 (e.g., the movement control module 440) (e.g., the processing circuits of the processor 220) may designate the target speed as the second speed.

In 1060, in response to determining that the reference moving distance is larger than the target distance, that is, the distance requirement cannot be met under the target speed condition, accordingly, the processing device 122 (e.g., the movement control module 440) (e.g., the processing circuits of the processor 220) may determine the second speed (i.e., determine an updated target speed) based on the target distance and the control algorithm. In some embodiments, it is assumed that a switching time point with respect to the first control algorithm and the second control algorithm is a time point (i.e., $T_e$) corresponding to a rise time parameter of the first control algorithm, the processing device 122 may determine the second speed (or the updated target speed) according to formulas (18) and (19) below:

$$S_t = 4.246 \frac{V_i'^2}{A_{max}} \quad (18)$$

$$V_i' = \sqrt{A_{max} \times \frac{S_t}{4.246}} \quad (19)$$

where $S_t$ refers to the target distance and $V'_i$ refers to the second speed (or the updated target speed).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 12A:
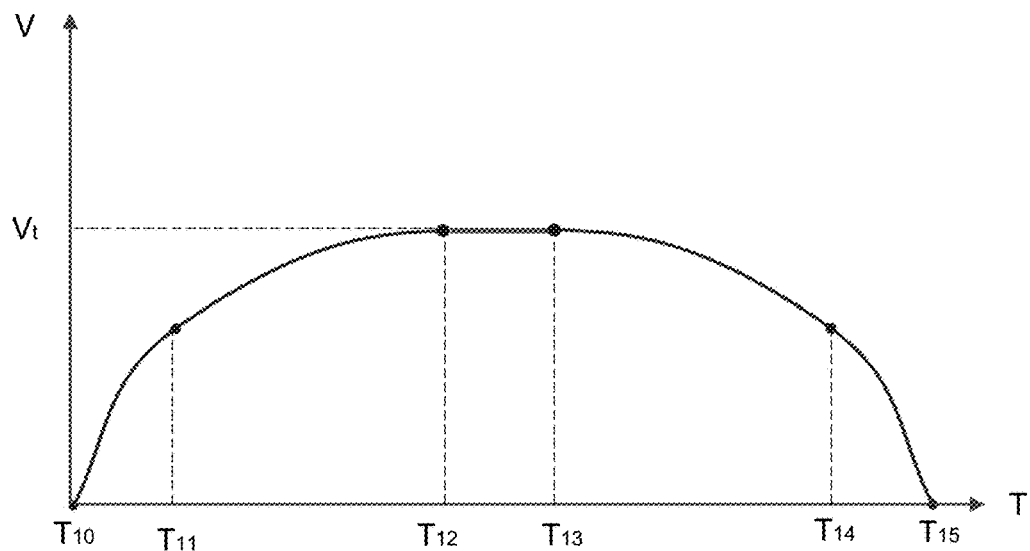
FIGS. 12A-12C are schematic diagrams illustrating exemplary speed-time curves associated with a movement of a capture device according to some embodiments of the present disclosure.
Figure 12B:
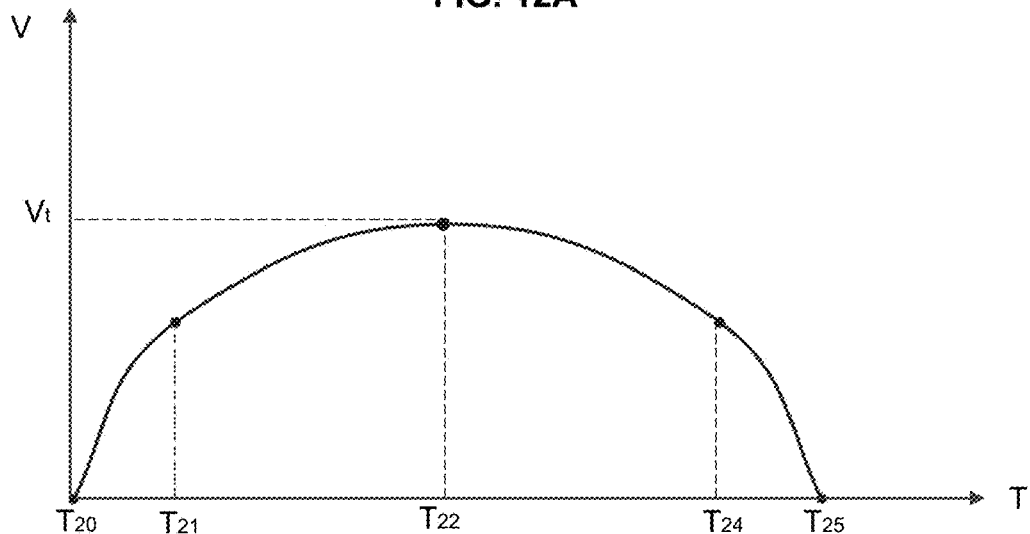
Figure 12C:
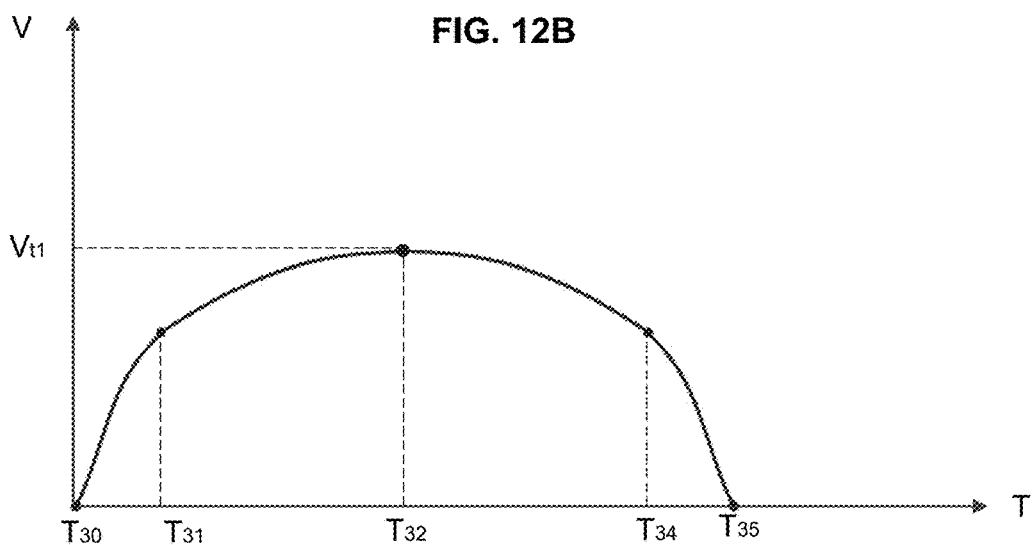

FIG. 11-(1) and FIG. 11-(2) are a flowchart illustrating an exemplary process for controlling a movement of a capture device based on a control algorithm including a first control algorithm and a second control algorithm according to some embodiments of the present disclosure. FIGS. 12A-12C are schematic diagrams illustrating exemplary speed-time curves associated with the movement of the capture device according to some embodiments of the present disclosure. In some embodiments, process 1100 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform process 1100. The operations of the illustrated process presented below are intended to be illustrative. In some embodiments, process 1100 may be accomplished with one or more additional operations not described and/or without one or more of the operations herein discussed. Additionally, the order in which the operations of the process illustrated in FIG. 11-(1) and FIG. 11-(2) and described below is not intended to be limiting.

In 1101, after receiving an instruction of controlling a movement of a capture device in an accurate positioning mode based on a control algorithm including a first control algorithm and a second control algorithm, the processing device 122 (e.g., the movement control module 440) (e.g., the interface circuits of the processor 220) may obtain at least one tracking parameter with respect to the accurate positioning mode and a switching time point. In some embodiments, the at least one tracking parameter with respect to the accurate positioning mode may include a target speed and a target distance.

In 1102, the processing device 122 (e.g., the movement control module 440) (e.g., the interface circuits of the processor 220) may obtain one or more parameters associated with the capture device and determine a maximum acceleration of the capture device based on the one or more parameters. Operation 1102 may be similar to operation 802, and the descriptions of which may be not repeated here.

In 1103, the processing device 122 (e.g., the movement control module 440) (e.g., the processing circuits of the processor 220) may determine a sum (also referred to as a "reference moving distance") of a reference acceleration distance and a reference deceleration distance. Operation 1103 may be similar to operation 1030, the descriptions of which may be not repeated here.

In 1104, according to a relationship between the target distance and the reference moving distance, the processing device 122 (e.g., the movement control module 440) (e.g., the processing circuits of the processor 220) may determine a type of a speed-time curve associated with the movement of the capture device and determine one or more time points associated with the speed-time curve.

In response to determining that the reference moving distance is smaller than the target distance, the type (also referred to as type I) of the speed-time curve (e.g., a speed-time curve illustrated in FIG. 12A) may include an acceleration stage (e.g., a time period from $T_{10}$ to $T_{12}$), a uniform-speed stage (e.g. a time period from $T_{12}$ to $T_{13}$), and a deceleration stage (e.g. a time period from $T_{13}$ to $T_{15}$) with the maximum speed as the target speed. As used herein, the one or more time points may include a start time point (e.g., $T_{10}$), a switching time point (e.g., $T_{11}$) with respect to the first control algorithm and the second control algorithm in the acceleration stage, an acceleration termination time point (e.g., $T_{12}$), a uniform speed termination time point (e.g., $T_{13}$), a switching time point (e.g., $T_{14}$) with respect to the first control algorithm and the second control algorithm in the deceleration stage, a deceleration termination time point (e.g., $T_{15}$), etc. It is assumed that the switching time point is a time point (i.e., $T_e$) corresponding to the rise time parameter of the first control algorithm, the processing device 122 may determine the one or more time points according to formula (20) below:

$$\begin{aligned}
T_{11} &= T_e = V_{max}/A_{max}; \\
T_{12} &= T_{11} + 2T_e = \frac{3V_{max}}{A_{max}}; \\
T_{13} - T_{12} &= \frac{s_t - s_r}{V_{max}}; \\
T_{13} &= \frac{3V_{max}}{A_{max}} + \frac{s_t - s_r}{V_{max}}; \\
T_{14} &= T_{13} + 2T_e; \\
T_{15} &= T_{14} + T_e
\end{aligned} \quad (20)$$

where $S_t$ refers to the target distance and $S_r$ refers to the reference moving distance.

In response to determining that the reference moving distance is equal to the target distance, the type (also referred to as type II) of the speed-time curve (e.g., a speed-time curve illustrated in FIG. 12B) may include an acceleration stage (e.g., a time period from $T_{20}$ to $T_{22}$) and a deceleration stage (e.g., a time period from $T_{22}$ to $T_{25}$) with the maximum speed as the target speed. As used herein, the one or more time points may include a start time point (e.g., $T_{20}$), a switching time point (e.g., $T_{21}$) with respect to the first control algorithm and the second control algorithm in the acceleration stage, an acceleration termination time point (e.g., $T_{22}$), a switching time point (e.g., $T_{24}$) with respect to the first control algorithm and the second control algorithm in the deceleration stage, a deceleration termination time point (e.g., $T_{25}$), etc.

In response to determining that the reference moving distance is larger than the target distance, as described in connection with operation 1040 and operation 1060, the processing device 122 may determine an updated speed based on the target distance and the control algorithm, accordingly, the type (also referred to as type III) of the speed-time curve (e.g., a speed-time curve illustrated in FIG. 12C) may include an acceleration stage (e.g., a time period from $T_{30}$ to $T_{32}$) and a deceleration stage (e.g., a time period from $T_{32}$ to $T_{35}$) with the maximum speed as the updated target speed. As used herein, the one or more time points may include a start time point (e.g., $T_{30}$), a switching time point (e.g., $T_{31}$) with respect to the first control algorithm and the second control algorithm in the acceleration stage, an acceleration termination time point (e.g., $T_{32}$), a switching time point (e.g., $T_{34}$) with respect to the first control algorithm and the second control algorithm in the deceleration stage, a deceleration termination time point (e.g., $T_{35}$), etc.

In 1105, the processing device 122 (e.g., the movement control module 440) (e.g., the processing circuits of the processor 220) may determine an acceleration time length of the acceleration stage based on the type of the speed-time curve associated with the movement of the capture device. More descriptions regarding the determination of acceleration time length may be found elsewhere in the present disclosure (e.g., operation 803 and the descriptions thereof).

In 1106, the processing device 122 (e.g., the movement control module 440) (e.g., the processing circuits of the processor 220) may determine a plurality of time points by discretizing the acceleration time length according to a specified period (e.g., a predetermined smallest period). Then the processing device 122 may determine a plurality of discrete pulse frequencies corresponding to the plurality of time points. Operation 1106 may be similar to operation 804, the descriptions of which may be not repeated here.

It is assumed that the type of the speed-time curve is the type I, in 1107, for any time point within a first acceleration time period (i.e., a period in which the capture device is controlled according to the first control algorithm) from a start time point (e.g., $T_{10}$ illustrated in FIG. 12A) to the switching time point (e.g., $T_{11}$ illustrated in FIG. 12A), the processing device 122 (e.g., the movement control module 440) (e.g., the processing circuits of the processor 220) may determine a speed of the capture device at the time point according to the first control algorithm.

In 1108, the processing device 122 (e.g., the movement control module 440) (e.g., the interface circuits of the processor 220) may obtain an interrupting period of a timer. The processing device 122 may then generate a pulse frequency corresponding to the speed of the capture device to drive the movement of the capture device based on the interrupting period. Operation 1108 may be similar to operation 806, the descriptions of which may be not repeated here.

In 1109, for any time point, the processing device 122 (e.g., the movement control module 440) (e.g., the processing circuits of the processor 220) may determine a current consecutive time length from the start time point to the current time point according to formula (16) above. Operation 1109 may be similar to operation 807, the descriptions of which may be not repeated here.

In 1110, the processing device 122 (e.g., the movement control module 440) (e.g., the processing circuits of the processor 220) may determine whether the time length is larger than a time length of the first acceleration time period (e.g., $(T_{11}-T_{10})$ illustrated in FIG. 12A). In response to determining that the time length is smaller than or equal to the time length of the first acceleration time period, the processing device 122 may proceed the process 1100 back to operation 1107. In 1111, in response to determining that the time length is larger than the time length of the first acceleration time period, that is, the movement control manner enters into a second acceleration time period in which the capture device is controlled according to the second control algorithm, accordingly, for any time point within the second acceleration time period, the processing device 122 (e.g., the movement control module 440) (e.g., the processing circuits of the processor 220) may determine a speed of the capture device at the time point according to the second control algorithm.

In 1112, the processing device 122 (e.g., the movement control module 440) (e.g., the interface circuits of the processor 220) may obtain an interrupting period of a timer (e.g., the same one described in operation 1108 or an independent one). Further, the processing device 122 may then generate a pulse frequency corresponding to the speed of the capture device to drive the movement of the capture device based on the interrupting period.

In 1113, for any time point, the processing device 122 (e.g., the movement control module 440) (e.g., the interface circuits of the processor 220) may determine a current consecutive time length from the start time point to the current time point according to formula (16) above.

In 1114, the processing device 122 may determine whether the time length is larger than a time length of the second acceleration time period (e.g., $(T_{12}-T_{10})$ illustrated in FIG. 12A). In response to determining that the time length is smaller than or equal to the time length of the second acceleration time period, the processing device 122 may proceed the process 1100 back to operation 1111. In 1115, in response to determining that the time length is larger than the time length of the second acceleration time period, the processing device 122 (e.g., the movement control module 440) (e.g., the processing circuits of the processor 220) may control the capture device to move with the target speed.

In 1116, for any time point, the processing device 122 (e.g., the movement control module 440) (e.g., the interface circuits of the processor 220) may determine a current consecutive time length from the start time point to the current time point according to formula (16) above.

In 1117, the processing device 122 (e.g., the movement control module 440) (e.g., the interface circuits of the processor 220) may determine whether the time length is larger than a time length from the start time point to a uniform speed termination time point (e.g., $(T_{13}-T_{10})$ illustrated in FIG. 12A). In response to determining that the time length is smaller than or equal to the time length from the start time point to a uniform speed termination time point, the processing device 122 may proceed the process 1100 back to operation 1116.

In 1118, in response to determining that the time length is larger than the time length from the start time point to the uniform speed termination time point, the processing device 122 (e.g., the movement control module 440) (e.g., the processing circuits of the processor 220) may decelerate the speed of the capture device within a deceleration time period from the time point to a deceleration termination time point (e.g., $T_{15}$ illustrated in FIG. 12A). Operation 1118 may be similar to operation 814, the descriptions of which may be not repeated here.

In some embodiments, if the type of the speed-time curve is the type II or type III, the processing device 122 may control the movement of the capture device in a similar way, which is not repeated here.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

We claim:

1. A system, comprising:
    at least one storage device including a set of instructions; and
    at least one processor in communication with the at least one storage device, wherein when executing the set of instructions, the at least one processor is configured to cause the system to:
    obtain at least one tracking parameter associated with a moving object;
    obtain a control algorithm including a first control algorithm and a second control algorithm associated with a capture device used to track the moving object, wherein the first control algorithm includes an exponential algorithm or T-shaped algorithm and the second control algorithm includes an S-shaped algorithm;
    determine a switching time point with respect to the first control algorithm and the second control algorithm based on the at least one tracking parameter;
    accelerate, according to the first control algorithm, a speed of the capture device from an initial speed to a first speed within a first acceleration time period from a start time point to the switching time point, the capture device moving a first acceleration distance within the first acceleration time period; and
    accelerate, according to the second control algorithm, the speed of the capture device from the first speed to a second speed within a second acceleration time period from the switching time point to an acceleration termination time point, the capture device moving a second acceleration distance within the second acceleration time period, wherein at least one of a moving distance of the capture device or the second speed satisfies the at least one tracking parameter, the moving distance of the capture device being determined based at least in part on the first acceleration distance and the second acceleration distance.

2. The system of claim 1, wherein the at least one tracking parameter includes at least one of a target speed or a target distance between an initial location of the capture device and a target location.

3. The system of claim 1, wherein to determine the switching time point with respect to the first control algorithm and the second control algorithm based on the at least one tracking parameter, the at least one processor is configured to cause the system to:
determine whether an external load applied to the capture device is larger than an external load threshold; and
in response to determining that the external load is larger than the external load threshold, designate a time point corresponding to a turning point of a torque-speed curve associated with the capture device as the switching time point.

4. The system of claim 3, wherein to determine the switching time point with respect to the first control algorithm and the second control algorithm based on the at least one tracking parameter, the at least one processor is configured to cause the system further to:
in response to determining that the external load is smaller than or equal to the external load threshold, determine whether a target speed included in the at least one tracking parameter is smaller than or equal to a speed threshold; and
in response to determining that the target speed is smaller than or equal to the speed threshold, designate a time point corresponding to a rise time parameter of the first control algorithm as the switching time point.

5. The system of claim 4, wherein to determine the switching time point with respect to the first control algorithm and the second control algorithm based on the at least one tracking parameter, the at least one processor is configured to cause the system further to:
in response to determining that the target speed is larger than the speed threshold, determine whether a computing load associated with the capture device is larger than a computing load threshold; and
in response to determining that the computing load is larger than the computing load threshold, designate the time point corresponding to the rise time parameter of the first control algorithm as the switching time point.

6. The system of claim 5, wherein to determine the switching time point with respect to the first control algorithm and the second control algorithm based on the at least one tracking parameter, the at least one processor is configured to cause the system further to:
in response to determining that the computing load is smaller than or equal to the computing load threshold, designate the time point corresponding to the turning point of the torque-speed curve associated with the capture device as the switching time point.

7. The system of claim 2, wherein the at least one tracking parameter comprises the target speed, and the second speed is determined to be equal to the target speed.

8. The system of claim 2, wherein the at least one tracking parameter comprises the target speed and the target distance, the moving distance of the capture device is determined to be equal to the target distance, and the second speed is determined according to a process including:
determining, based on the target speed and the control algorithm, a reference acceleration distance, wherein the reference acceleration distance comprises a first reference acceleration distance and a second reference acceleration distance;
determining a reference deceleration distance based on the reference acceleration distance;
determining a reference moving distance based on the reference acceleration distance and the reference deceleration distance;
determining whether the reference moving distance is smaller than or equal to the target distance; and
in response to determining the reference moving distance is smaller than or equal to the target distance, designating the target speed as the second speed.

9. The system of claim 8, the process further including:
in response to determining that the reference moving distance is larger than the target distance, determining the second speed based on the target distance and the control algorithm.

10. The system of claim 1, wherein the at least one processor is configured to cause the system further to:
decelerate, according to the second control algorithm, the speed of the capture device from the second speed to the first speed within a first deceleration time period, the capture device moving a first deceleration distance within the first deceleration time period; and
decelerate, according to the first control algorithm, the speed of the capture device from the first speed to the initial speed within a second deceleration time period, the capture device moving a second deceleration distance within the second deceleration period, wherein the moving distance of the capture device is determined based at least in part on the first acceleration distance, the second acceleration distance, the first deceleration distance, and the second deceleration distance.

11. A method implemented on a computing device including at least one processor, at least one storage medium, and a communication platform connected to a network, the method comprising:
obtaining at least one tracking parameter associated with a moving object;
obtaining a control algorithm including a first control algorithm and a second control algorithm associated with a capture device used to track the moving object, wherein the first control algorithm includes an exponential algorithm or T-shaped algorithm and the second control algorithm includes an S-shaped algorithm;
determining a switching time point with respect to the first control algorithm and the second control algorithm based on the at least one tracking parameter;
accelerating, according to the first control algorithm, a speed of the capture device from an initial speed to a first speed within a first acceleration time period from a start time point to the switching time point, the capture device moving a first acceleration distance within the first acceleration time period; and
accelerating, according to the second control algorithm, the speed of the capture device from the first speed to a second speed within a second acceleration time period from the switching time point to an acceleration termination time point, the capture device moving a second acceleration distance within the second acceleration time period, wherein at least one of a moving distance of the capture device or the second speed satisfies the at least one tracking parameter, the moving distance of the capture device being determined based at least in part on the first acceleration distance and the second acceleration distance.

12. The method of claim 11, wherein the determining the switching time point with respect to the first control algorithm and the second control algorithm based on the at least one tracking parameter includes:
determine whether an external load applied to the capture device is larger than an external load threshold; and
in response to determining that the external load is larger than the external load threshold, designating a time point corresponding to a turning point of a torque-speed curve associated with the capture device as the switching time point.

13. The method of claim 12, wherein the determining the switching time point with respect to the first control algorithm and the second control algorithm based on the at least one tracking parameter includes:
in response to determining that the external load is smaller than or equal to the external load threshold, determining whether a target speed included in the at least one tracking parameter is smaller than or equal to a speed threshold; and
in response to determining that the target speed is smaller than or equal to the speed threshold, designating a time point corresponding to a rise time parameter of the first control algorithm as the switching time point.

14. The method of claim 13, wherein the determining the switching time point with respect to the first control algorithm and the second control algorithm based on the at least one tracking parameter includes:
in response to determining that the target speed is larger than the speed threshold, determining whether a computing load associated with the capture device is larger than a computing load threshold; and
in response to determining that the computing load is larger than the computing load threshold, designating the time point corresponding to the rise time parameter of the first control algorithm as the switching time point.

15. The method of claim 14, wherein the determining the switching time point with respect to the first control algorithm and the second control algorithm based on the at least one tracking parameter includes:
in response to determining that the computing load is smaller than or equal to the computing load threshold, designating the time point corresponding to the turning point of the torque-speed curve associated with the capture device as the switching time point.

16. The method of claim 11, wherein the at least one tracking parameter comprises a target speed, and the second speed is determined to be equal to the target speed.

17. The method of claim 11, wherein the at least one tracking parameter comprises a target speed and a target distance between an initial location of the capture device and a target location, the moving distance of the capture device is determined to be equal to the target distance, and the second speed is determined according to a process including:

determining, based on the target speed and the control algorithm, a reference acceleration distance, wherein the reference acceleration distance comprises a first reference acceleration distance and a second reference acceleration distance;
determining a reference deceleration distance based on the reference acceleration distance;
determining a reference moving distance based on the reference acceleration distance and the reference deceleration distance;
determining whether the reference moving distance is smaller than or equal to the target distance; and
in response to determining the reference moving distance is smaller than or equal to the target distance, designating the target speed as the second speed.

18. The method of claim 17, the process further including:
in response to determining that the reference moving distance is larger than the target distance, determining the second speed based on the target distance and the control algorithm.

19. A non-transitory computer readable medium, comprising executable instructions that, when executed by at least one processor, direct the at least one processor to perform a method, the method comprising:
obtaining at least one tracking parameter associated with a moving object;
obtaining a control algorithm including a first control algorithm and a second control algorithm associated with a capture device used to track the moving object, wherein the first control algorithm includes an exponential algorithm or T-shaped algorithm and the second control algorithm includes an S-shaped algorithm;
determining a switching time point with respect to the first control algorithm and the second control algorithm based on the at least one tracking parameter;
accelerating, according to the first control algorithm, a speed of the capture device from an initial speed to a first speed within a first acceleration time period from a start time point to the switching time point, the capture device moving a first acceleration distance within the first acceleration time period; and
accelerating, according to the second control algorithm, the speed of the capture device from the first speed to a second speed within a second acceleration time period from the switching time point to an acceleration termination time point, the capture device moving a second acceleration distance within the second acceleration time period, wherein at least one of a moving distance of the capture device or the second speed satisfies the at least one tracking parameter, the moving distance of the capture device being determined based at least in part on the first acceleration distance and the second acceleration distance.

* * * * *